(12) United States Patent
Hattori et al.

(10) Patent No.: US 11,300,538 B2
(45) Date of Patent: Apr. 12, 2022

(54) GAS SENSOR ASSEMBLING APPARATUS AND ASSEMBLING METHOD

(71) Applicant: NGK INSULATORS, LTD., Nagoya (JP)

(72) Inventors: Tetsuya Hattori, Konan (JP); Hiroyuki Tanaka, Nagoya (JP); Shinichiro Shichi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 359 days.

(21) Appl. No.: 16/197,454

(22) Filed: Nov. 21, 2018

(65) Prior Publication Data

US 2019/0086358 A1 Mar. 21, 2019

Related U.S. Application Data

(63) Continuation of application No. PCT/JP2017/019537, filed on May 25, 2017.

(30) Foreign Application Priority Data

May 25, 2016 (JP) .............................. JP2016-104278

(51) Int. Cl.
*G01N 27/407* (2006.01)
*G01N 27/409* (2006.01)
(Continued)

(52) U.S. Cl.
CPC ....... *G01N 27/4071* (2013.01); *G01B 11/002* (2013.01); *G01N 27/409* (2013.01);
(Continued)

(58) Field of Classification Search
CPC .......... G01N 27/4071; G01N 27/4078; G01N 27/416; G01B 11/002; H01R 43/20; G01M 15/02
(Continued)

(56) References Cited

U.S. PATENT DOCUMENTS

2010/0269568 A1 10/2010 Kanao et al.
2012/0071042 A1 3/2012 Masuda et al.
(Continued)

FOREIGN PATENT DOCUMENTS

EP 2 730 917 A1 5/2014
EP 2 918 997 A1 9/2015
(Continued)

OTHER PUBLICATIONS

International Search Report of PCT/JP2017/019537 dated Aug. 15, 2017.
(Continued)

*Primary Examiner* — Bethany L Martin
*Assistant Examiner* — Kourtney R S Carlson
(74) *Attorney, Agent, or Firm* — Mattingly & Malur, PC

(57) ABSTRACT

In a gas sensor assembling apparatus configured to integrate first and second gas sensor components, a posture adjustment part configured to adjust the posture of a first member in a horizontal plane adjusts the posture of the first member to an insertion possible posture determined in advance while holding the first member having been transferred from a conveyance mechanism at a posture adjustment position fixedly determined in advance, and transfers the first member in the insertion possible posture to the conveyance mechanism while maintaining at the posture adjustment position, the conveyance mechanism conveys, to an integration position, the first member in the insertion possible posture, and at the integration position, the first member and the second member are integrated with each other by inserting a sensor element of a second member into an insertion port of the first member in the insertion possible posture.

25 Claims, 23 Drawing Sheets

(51) Int. Cl.
*G01N 27/416* (2006.01)
*G01B 11/00* (2006.01)
*H01R 43/20* (2006.01)

(52) U.S. Cl.
CPC ....... *G01N 27/4078* (2013.01); *G01N 27/416* (2013.01); *H01R 43/20* (2013.01)

(58) Field of Classification Search
USPC .......................................................... 204/424
See application file for complete search history.

(56) References Cited

U.S. PATENT DOCUMENTS

2016/0064888 A1    3/2016  Katou et al.
2016/0202144 A1*   7/2016  Oba .................... F02D 41/1454
                                                    73/114.31

FOREIGN PATENT DOCUMENTS

| JP | 09-171879 A | 6/1997 |
| JP | 2004-009200 A | 1/2004 |
| JP | 2006284223 A | 10/2006 |
| JP | 2010-256100 A | 11/2010 |
| JP | 5082013 | 9/2012 |
| JP | 2013-83539 A | 5/2013 |
| JP | 2014-220213 A | 11/2014 |
| WO | 2011125476 A1 | 10/2011 |

OTHER PUBLICATIONS

Extended European Search Report received in corresponding European Application No. 17802882.5 dated Dec. 18, 2019.

\* cited by examiner

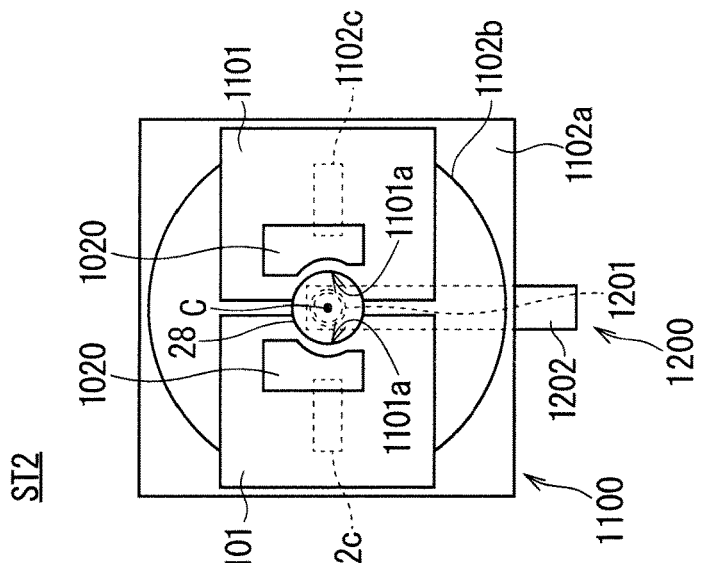
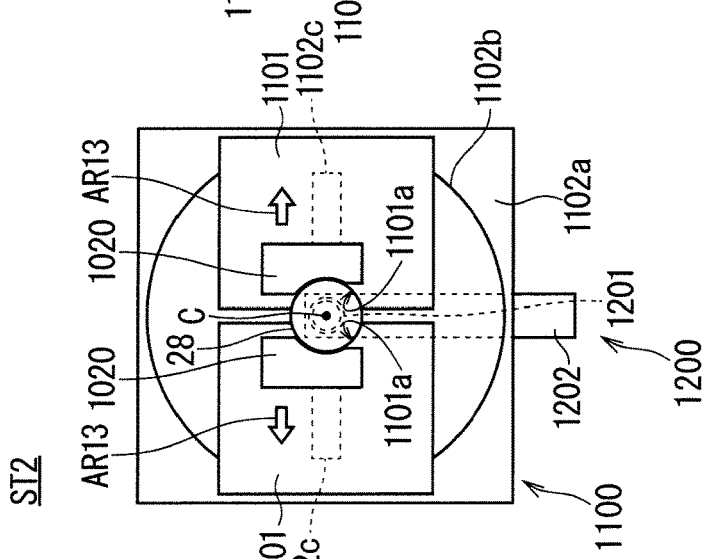
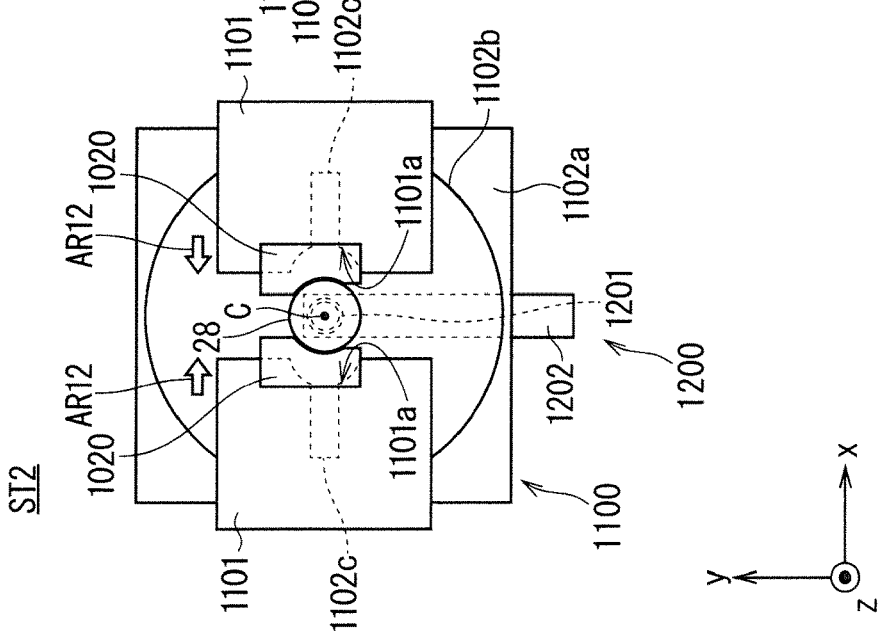

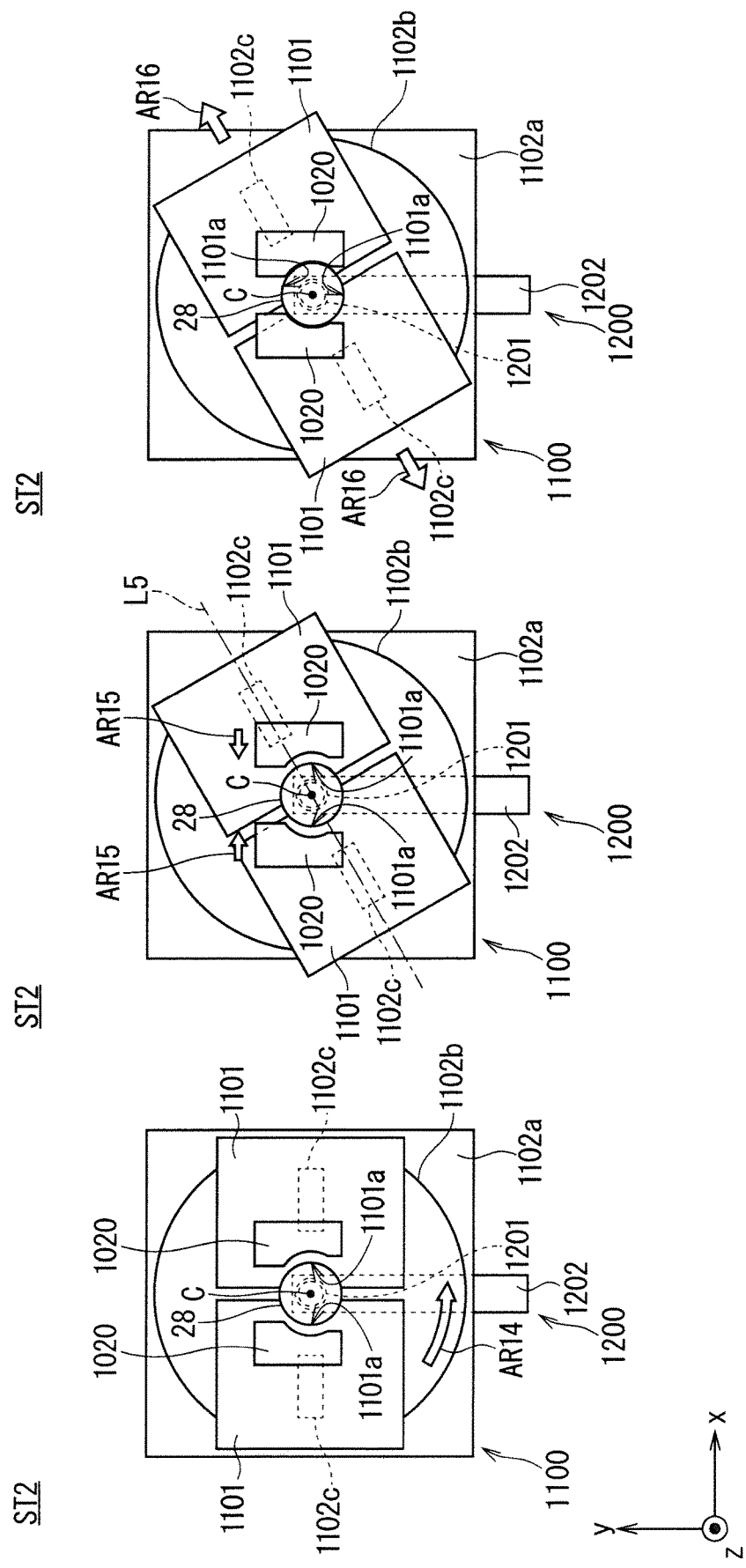

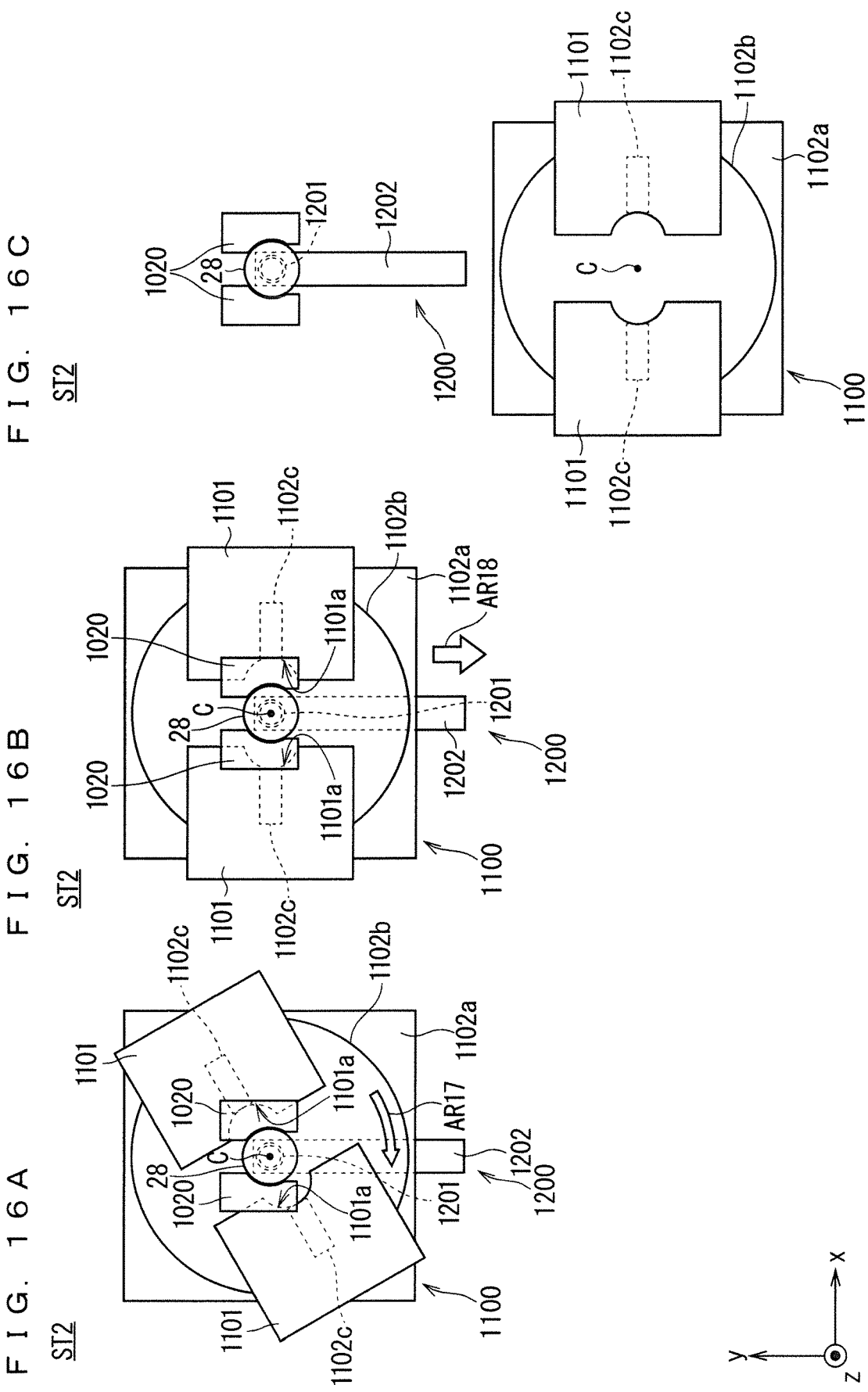

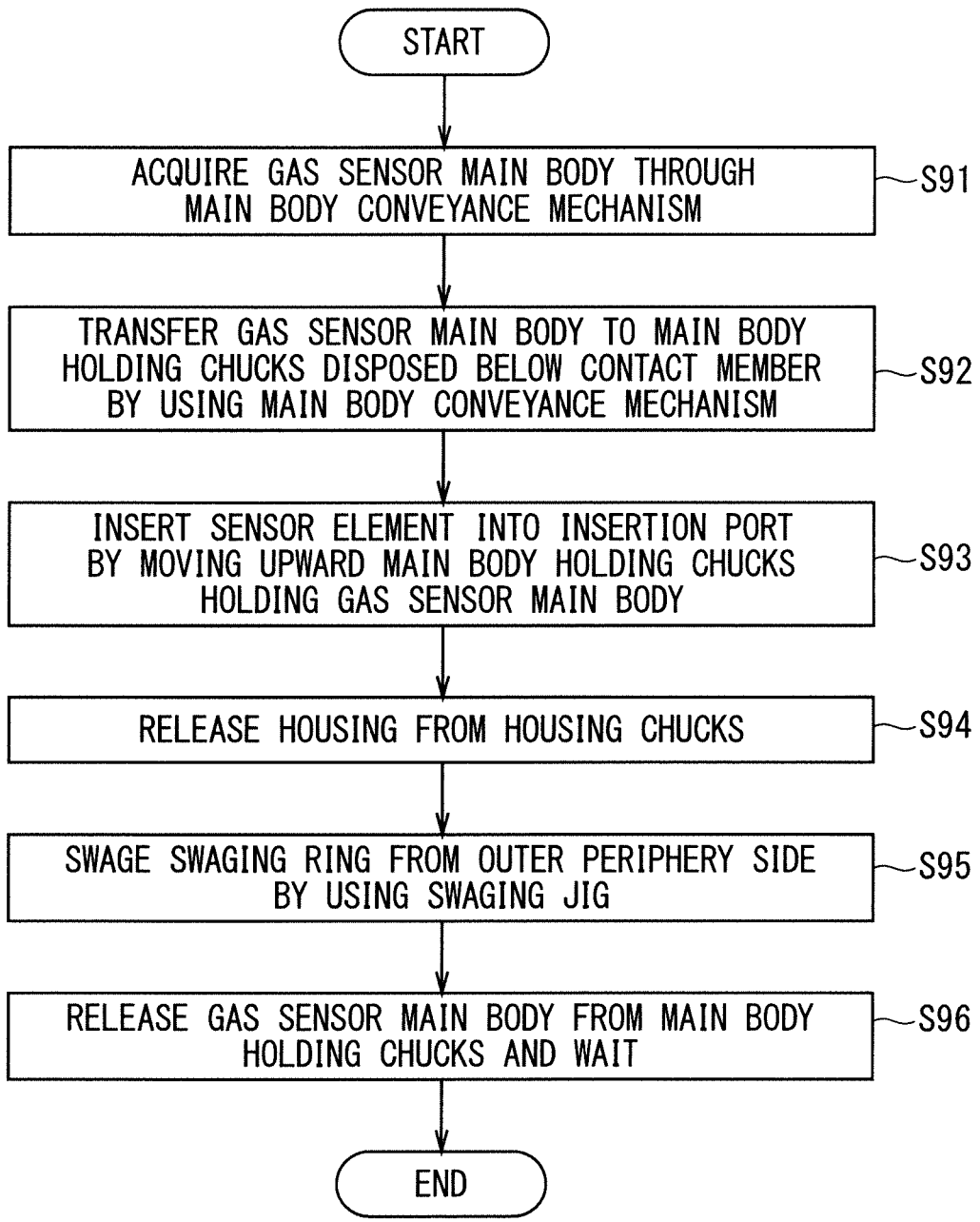

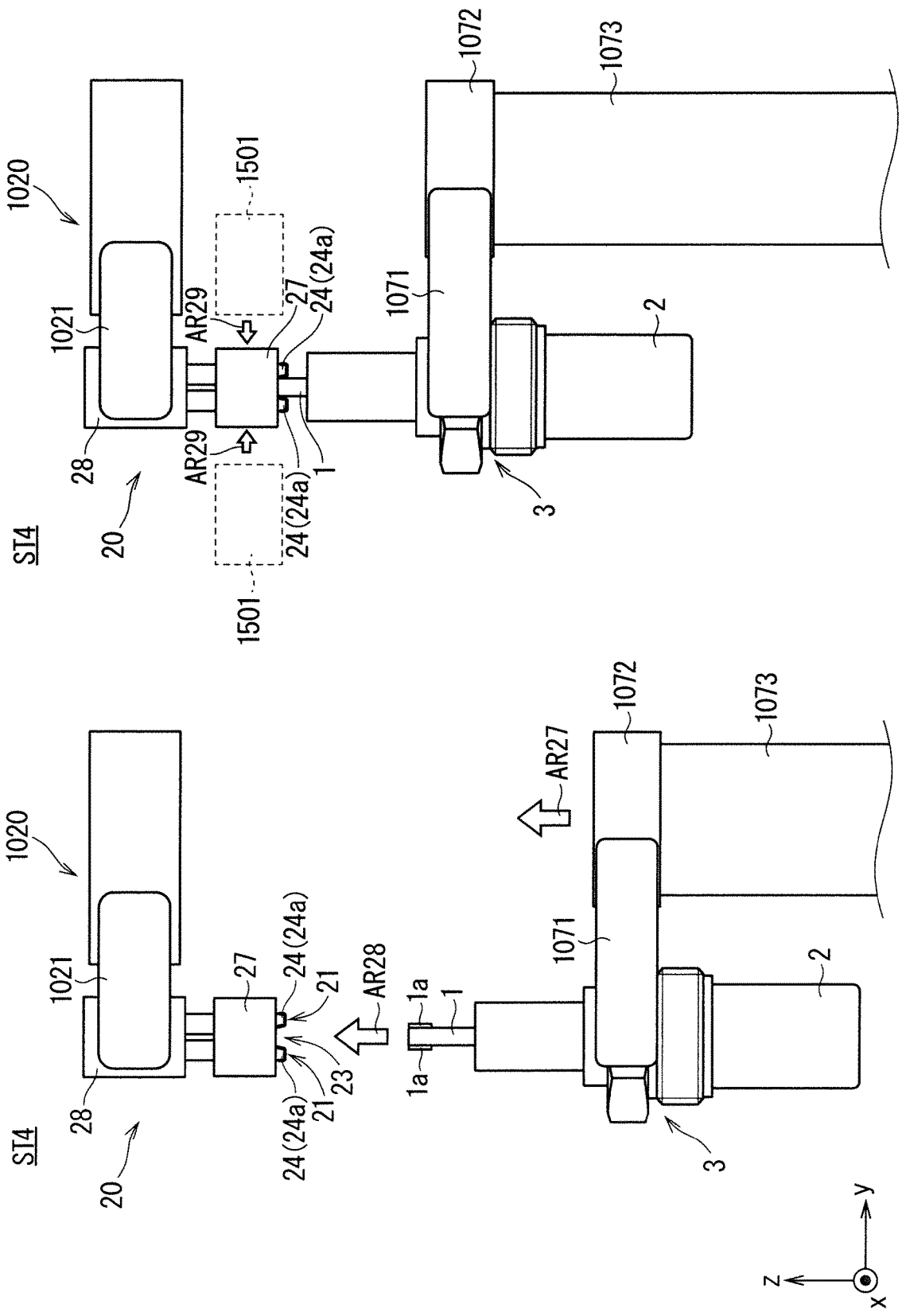

GAS SENSOR ASSEMBLING APPARATUS AND ASSEMBLING METHOD

TECHNICAL FIELD

The present invention relates to an assembling apparatus configured to assemble a gas sensor, and particularly relates to an apparatus for inserting a sensor element of a gas sensor into a contact member.

BACKGROUND ART

Conventionally, various measuring apparatuses have been used to determine the concentration of a desired gas component in measurement gas. For example, an oxygen-ion conductive gas sensor (NOx sensor) made of, for example, zirconia ($ZrO_2$) has been publicly known as an apparatus configured to measure a NOx concentration in measurement gas such as combustion gas (refer to Japanese Patent Application Laid-Open No. 2006-284223, for example). Typically, a plurality of electrode terminals are provided on the surface of a sensor element of such a gas sensor for voltage application, outputting of a detection signal, supply of electrical power to a heater unit, and the like.

The gas sensor includes a contact member configured to hold the sensor element inserted therein. For example, a publicly known gas sensor includes a ceramics housing in which an insertion port to which the sensor element is inserted is formed by a pair of housing members disposed opposite to each other, and a contact member including a plurality of contact-point members each attached to a housing member and formed of a metal terminal, and a plurality of lead wires connected with the contact-point members to achieve electric conduction between the sensor element and the outside (refer to Japanese Patent No. 5082013, for example).

In the gas sensor disclosed in Japanese Patent No. 5082013, the electric conduction between the sensor element and the outside is achieved in a manner that the contact members hold the sensor element inserted into the insertion port so that the contact-point members are in contact with the electrode terminals.

When the sensor element is inserted into the contact member, the positions and postures thereof need to be determined before the insertion so as to prevent the occurrence of interference and collision therebetween.

In addition, to reliably achieve the insertion, the insertion port of the housing is preferably wide opened in advance until the sensor element is inserted. This opening is achieved by, for example, first, inserting an opening pin having a thickness equal to or slightly larger than that of the sensor element into the insertion port, and subsequently, inserting opening claws into gaps formed at both side surfaces of the housing due to the pin insertion, and then removing the opening pin being inserted in the insertion port.

However, even when such opening is performed, the positions and postures of the contact member, the opening pin, and the opening claws need to be determined to prevent interference and collision of the contact member with the opening pin and the opening claws. When a translation difference is generated between the disposed position of the contact member and the disposed positions of the opening pin and the opening claws or when the contact member is tilted from a correct posture, the opening pin and the opening claws are not inserted into correct positions due to interference or collision with the housing, and the insertion port is not excellently wide opened. To avoid such failure, first, the disposed position and posture of the contact member when the opening is performed need to be constant.

Moreover, even when the disposed position and posture of the contact member are correctly adjusted before the insertion of the sensor element or before the opening of the insertion port, the sensor element, or the opening pin and the opening claws are made to collide with the housing once deviation occurs to the posture of the contact member due to, for example, vibration generated at subsequent conveyance or the like, and thus it is preferable to avoid generation of posture deviation due to the conveyance.

When the interference or collision as described above occurs in the process of mass production of gas sensors, the insertion of the sensor element cannot be performed and the operation rate of the process decreases, which is not preferable.

In addition, in the case that the orientation of the sensor element at insertion into the contact member is defined, it is important to perform the insertion without wrongly setting the orientation. For example, if the insertion is performed in a wrong orientation, such failure can occur that electrical connection between the sensor element and the outside of the gas sensor is not correctly obtained.

SUMMARY

The present invention relates to an assembling apparatus configured to assemble a gas sensor, and particularly relates to an apparatus for inserting a sensor element of a gas sensor into a contact member to electrically connect with the gas sensor.

According to the present invention, a gas sensor assembling apparatus according to a first aspect of the present invention integrates a first gas sensor component and a second gas sensor component by inserting, into an insertion port provided to the first gas sensor component, a sensor element provided to the second gas sensor component and partially protruding from the second gas sensor component. The gas sensor assembling apparatus includes: a conveyance mechanism configured to convey the first gas sensor component; a posture adjustment station including a posture adjustment part configured to adjust the posture of the first gas sensor component in a horizontal plane; and an integration station configured to integrate the first gas sensor component and the second gas sensor component. The conveyance mechanism and the posture adjustment part are capable of transferring the first gas sensor component to each other. The posture adjustment part adjusts the posture of the first gas sensor component to an insertion possible posture determined in advance with holding the first gas sensor component having been transferred from the conveyance mechanism at a posture adjustment position fixedly determined in advance, and transfers the first gas sensor component after adjustment to the insertion possible posture to the conveyance mechanism while maintaining the first gas sensor component at the posture adjustment position. The conveyance mechanism conveys the first gas sensor component after adjustment to the insertion possible posture to an integration position determined in advance at the integration station while maintaining the insertion possible posture. At the integration position, the first gas sensor component and the second gas sensor component are integrated by inserting the sensor element of the second gas sensor component into the insertion port of the first gas sensor component after adjustment to the insertion possible posture.

According to the present invention, even when the first gas sensor component is subjected to holding by the conveyance mechanism without precise adjustment of the posture thereof at integration of the first gas sensor component and the second gas sensor component, the first gas sensor component is adjusted, so that the position and posture thereof become the insertion possible posture determined in advance at the posture adjustment position determined in advance before the integration with the second gas sensor component. Accordingly, the processing reliability and efficiency of the gas sensor assembly processing are improved.

Preferably, in the gas sensor assembling apparatus of the present invention: the conveyance mechanism includes an opening securing element configured to securing an opening of the insertion port provided to the first gas sensor component; the opening securing element secures said opening of said insertion port on the first gas sensor component after adjustment to said insertion possible posture, with holding the first gas sensor component at the posture adjustment position; the first gas sensor component is conveyed to the integration position by the conveyance mechanism securing the opening of the insertion port by the opening securing element; and at the integration position, the sensor element is inserted into the insertion port at which the opening is secured.

In this preferable aspect, the opening state of the insertion port into which the sensor element provided to the second gas sensor component is inserted is reliably secured in the first gas sensor component in the insertion possible posture determined in advance at the posture adjustment position determined in advance. Accordingly, the occurrence of failure due to interference and collision of the opening securing means with the first gas sensor component is eliminated, and thus the processing reliability and efficiency of the gas sensor assembly processing are further improved.

According to another aspect of the present invention, the gas sensor assembling apparatus further includes: an orientation check station checks the disposed orientation of the first gas sensor component in the insertion possible posture in a horizontal plane is performed when a directional relation between the first gas sensor component and the second gas sensor component at insertion of the sensor element into the insertion port of the first gas sensor component is determined in advance, the orientation check station being provided between the posture adjustment station and the integration station; and an orientation determination element configured to determine, based on a result of checking in the orientation check station, whether the disposed orientation of the first gas sensor component in the insertion possible posture in a horizontal plane is a positive orientation or an opposite orientation different from each other by 180°. An insertion orientation of the second gas sensor component to the insertion port at the integration station is specified based on a result of the determination by the orientation determination element.

According to this aspect of the present invention, the sensor element can be inserted into the insertion port in a correct orientation regardless of whether the disposed orientation of the first gas sensor component in the insertion possible posture in a horizontal plane is the positive orientation or the opposite orientation, which eliminates the need to check the orientation of the first gas sensor component or align the orientation to a predetermined orientation at a time when the first gas sensor component is held by the conveyance mechanism. Accordingly, the processing reliability and efficiency of the gas sensor assembly processing are improved.

According to still another aspect of the present invention, in the gas sensor assembling apparatus, the conveyance mechanism further includes harness restriction means configured to restrict part of the wire harness to inside of a region provided in advance.

According to this aspect of the present invention, since the wire harness is restricted to the restriction region, it is possible to prevent interference of the wire harness and change of the position and posture of the first gas sensor component due to application of the weight of the wire harness onto the first gas sensor component at integration of the first gas sensor component and the second gas sensor component.

An object of the present invention is thus to provide an apparatus capable of reliably and efficiently performing processing of inserting a sensor element into a contact member in a gas sensor manufacturing process.

BRIEF DESCRIPTION OF DRAWINGS

FIGS. 14A, 14B, and 14C are top views illustrating, at stages, the state of change of the posture adjustment station ST2 halfway through the posture adjustment.

FIGS. 15A, 15B, and 15C are top views illustrating, at stages, the state of change of the posture adjustment station ST2 halfway through the posture adjustment.

FIGS. 16A, 16B, and 16C are top views illustrating, at stages, the state of change of the posture adjustment station ST2 halfway through the posture adjustment.

FIG. 23 is a diagram illustrating a specific procedure of integration processing performed at an integration station ST4.

FIGS. 24A and 24B are main part side views illustrating a state halfway through the integration processing.

DESCRIPTION OF EMBODIMENTS

Schematic Structure of Gas Sensor

Figure 1A:
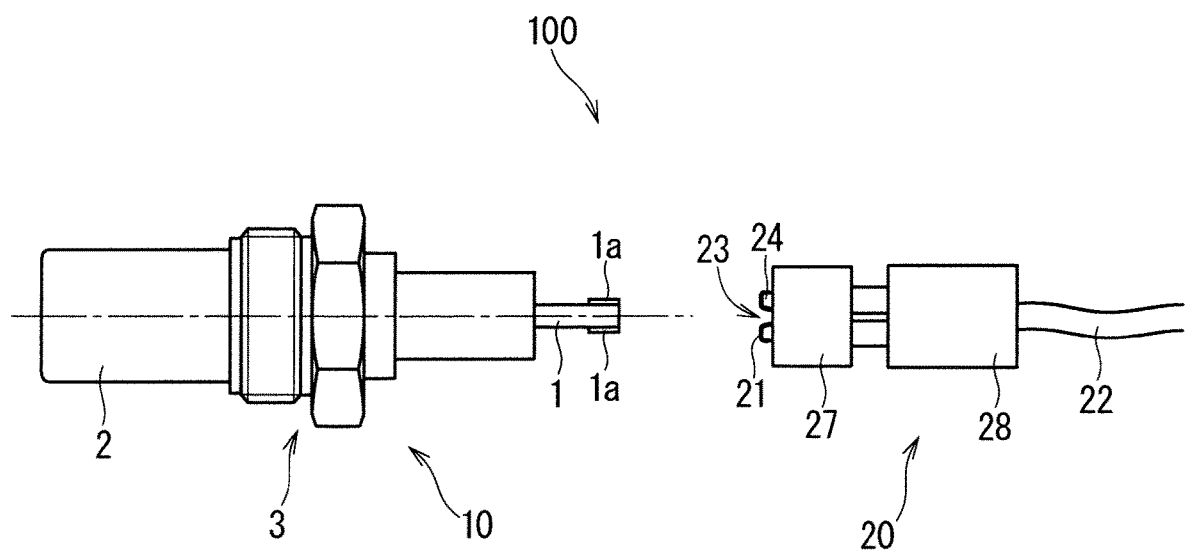
FIGS. 1A and 1B are diagrams illustrating a state at assembly of a gas sensor 100.
Figure 1B:
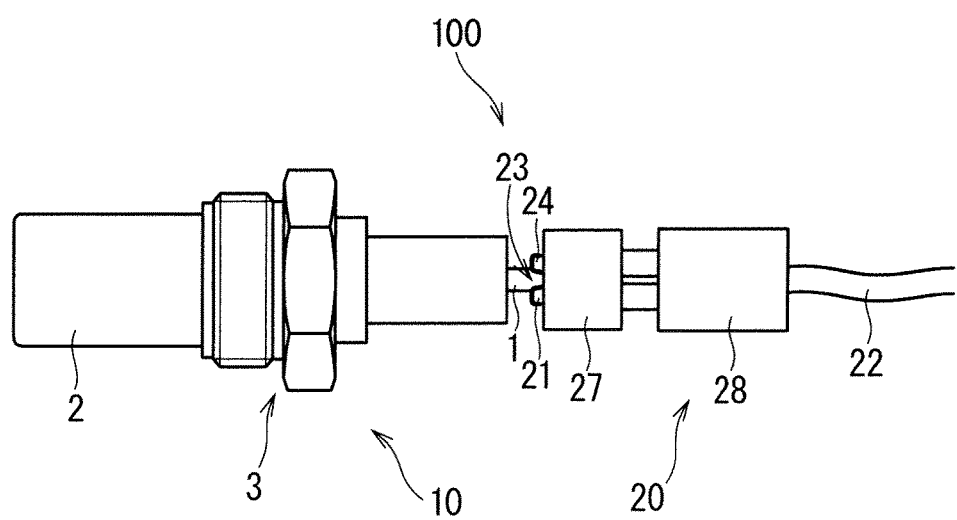
Figure 2:
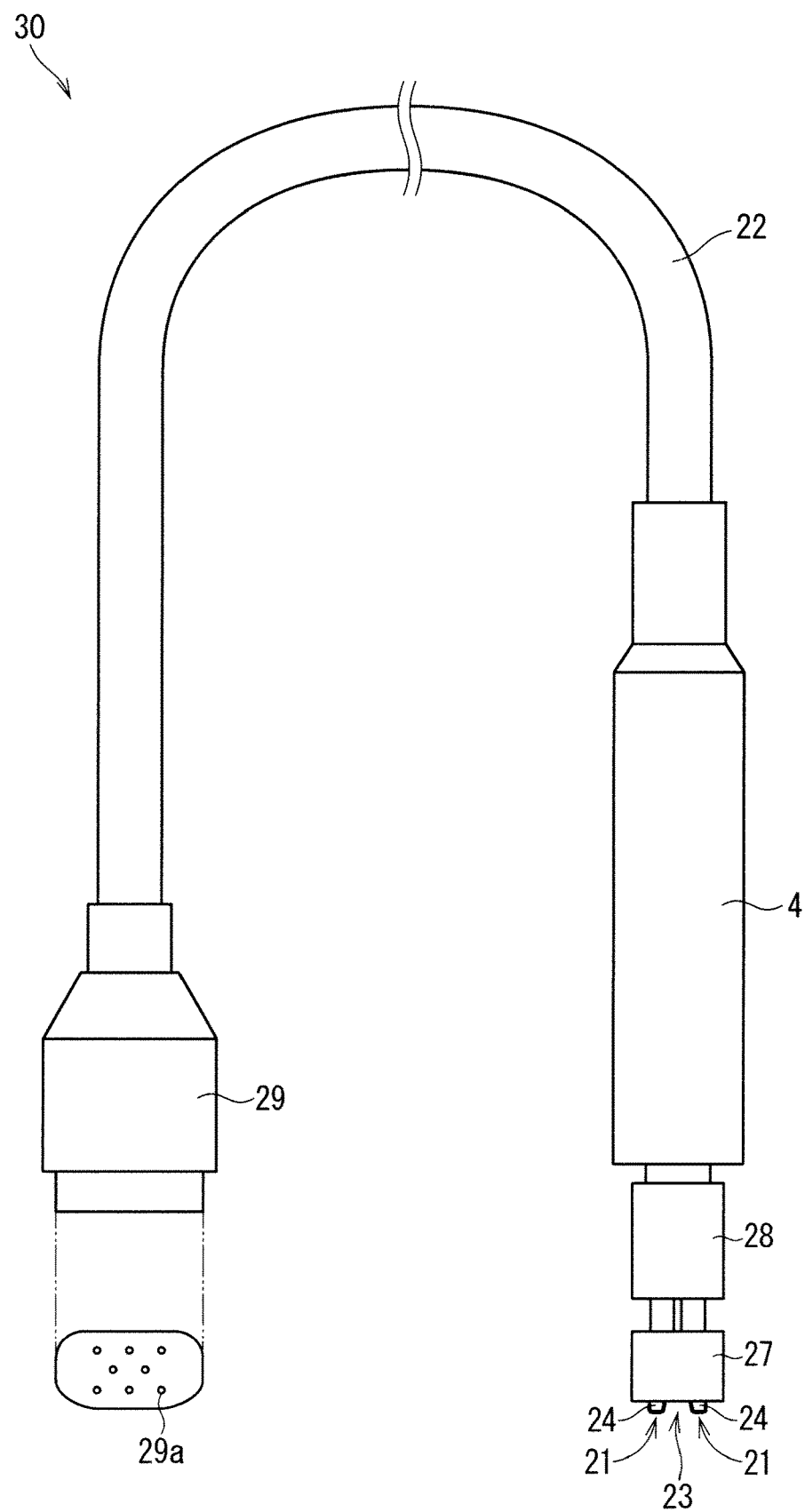
FIG. 2 is a diagram illustrating a wiring side assembly 30.

The following first describes a schematic structure of a gas sensor 100 as an assembly target in the present embodiment. The gas sensor 100 detects a predetermined gas component (target gas component) in measurement target gas (measurement gas) and measures the concentration thereof. FIGS. 1A and 1B are diagrams illustrating a state at assembly of the gas sensor 100. FIG. 1A illustrates a state before the assembly, and FIG. 1B illustrates a state after the assembly. FIG. 2 is a diagram illustrating a wiring side assembly 30 as part of the gas sensor 100 after the assembly. The gas sensor 100 schematically has a structure in which a gas sensor main body (also referred to as a primary assembly) 10 (second gas sensor component) is integrated with a contact member 20 (first gas sensor component) as part of the wiring side assembly (also referred to as an auxiliary assembly) 30.

The gas sensor main body 10 includes a sensor element 1 as a gas detection portion, a housing member 2 housing the sensor element 1, and a bolt 3 provided on the outer periphery of the housing member 2 and used to attach the gas sensor 100 to a predetermined measurement place.

The contact member 20 mainly includes a plurality of contact-point members 21, a wire harness 22 housing a plurality of lead wires (not illustrated) connected with the contact-point members 21, a ceramic housing 24 configured to hold the sensor element 1 inserted in an insertion port 23 with the contact-point members 21, a swaging ring 27 provided to fix the housing 24 into which the sensor element 1 is inserted, from the outer periphery of the housing 24, and a grommet (rubber plug) 28 in which the lead wires are inserted air-tight.

As illustrated in FIG. 1B, the gas sensor 100 is integrated with insertion of a leading end part (part protruding from the housing member 2) including an electrode terminal 1a of the sensor element 1 provided to the gas sensor main body 10 into the insertion port 23 of the housing 24 provided to the contact member 20, and holding the sensor element 1 in the housing 24 with the contact-point members 21.

In addition, as illustrated in FIG. 2, a connector 29 for electrically connecting the gas sensor 100 with an external control unit is provided at an end part of the wire harness 22, which is opposite to the contact member 20. The connector 29 includes a plurality of connector pins 29a at a leading end part thereof. Preferably, the connector 29 is anisotropic in the shape of the leading end part or disposition of the connector pins 29a or is provided with different colors at different places to facilitate identification of the orientation thereof.

In the present embodiment, a configuration in which the contact member 20 is provided at one end part of the wire harness 22 and the connector 29 is provided at the other end part thereof is referred to as the wiring side assembly 30.

Although not illustrated in FIGS. 1A and 1B, more specifically, in the gas sensor 100 after assembly illustrated in FIG. 1B, the contact member 20 and part of the gas sensor main body 10 on the right side of the bolt 3 in FIG. 1B are covered by an outer tube 4 illustrated in FIG. 2. However, the covering by the outer tube 4 is performed after integration of the gas sensor main body 10 and the contact member 20, and thus the wire harness 22 is inserted into the outer tube 4 as illustrated in FIG. 2 in advance when the wiring side assembly 30 is prepared. In the present embodiment, the gas sensor 100 in which the covering by the outer tube 4 is yet to be performed is referred to as an uncovered product 100a, in particular.

Figure 3:
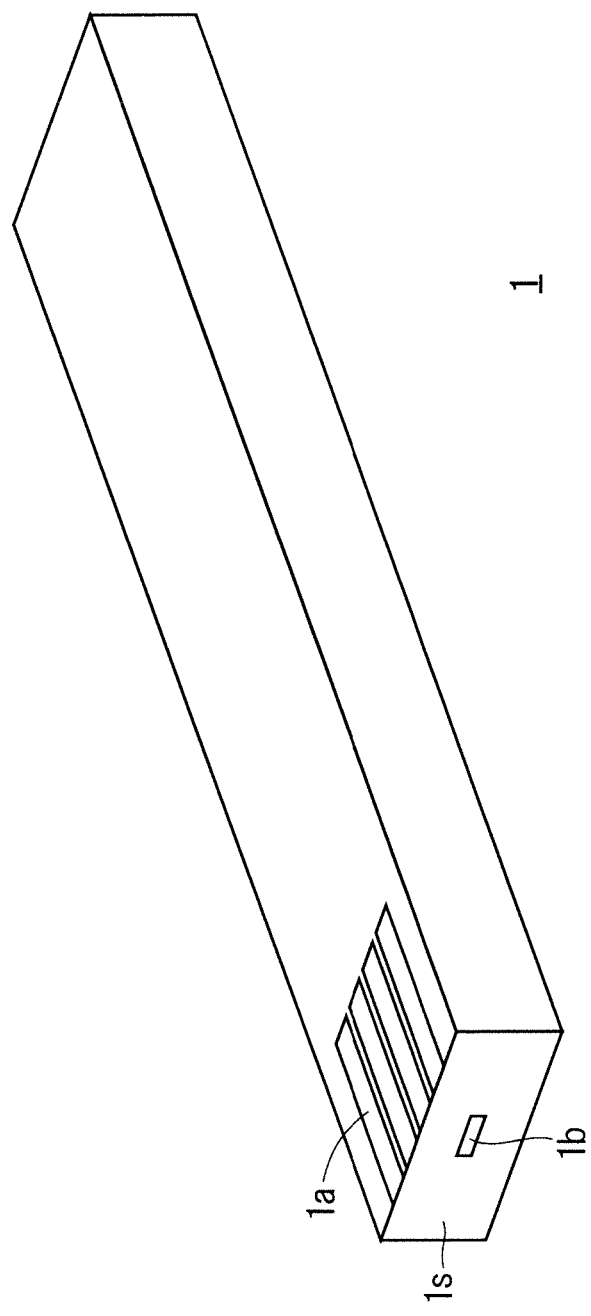
FIG. 3 is a perspective view illustrating the outer shape of a sensor element 1.

FIG. 3 is a perspective view illustrating the outer shape of the sensor element 1. The sensor element 1 has a structure in which a plurality of layers each made of oxygen-ion conductive solid electrolyte such as zirconia ($ZrO_2$) are laminated. A plurality of the electrode terminals 1a are provided to the front and back surfaces of the sensor element 1 for voltage application, outputting of a detection signal, supply of electrical power to a heater unit, and the like. Although FIG. 3 illustrates that the four electrode terminals 1a are provided on one surface of the sensor element 1, another four electrode terminals 1a are provided on the back surface (not illustrated) of the sensor element 1. The sensor element 1 includes, on a leading surface is on a side where the electrode terminals 1a are provided, a gas introduction port 1b through which reference gas is introduced, and includes a measurement gas introduction port (not illustrated) at the other end part.

The sensor element 1 is manufactured by, for example, performing predetermined process and printing patterns of electrode and wiring on a ceramics green sheet corresponding to each layer, laminating those sheets, cutting the resultant one into a predetermined size, and firing the laminated body thus obtained. The gas sensor 100 detects a target gas component in measurement gas by exploiting a phenomenon that, when the measurement gas is introduced into the sensor element 1, current in accordance with the existence amount of the target gas component flows between predetermined electrodes provided inside.

Figure 4A:
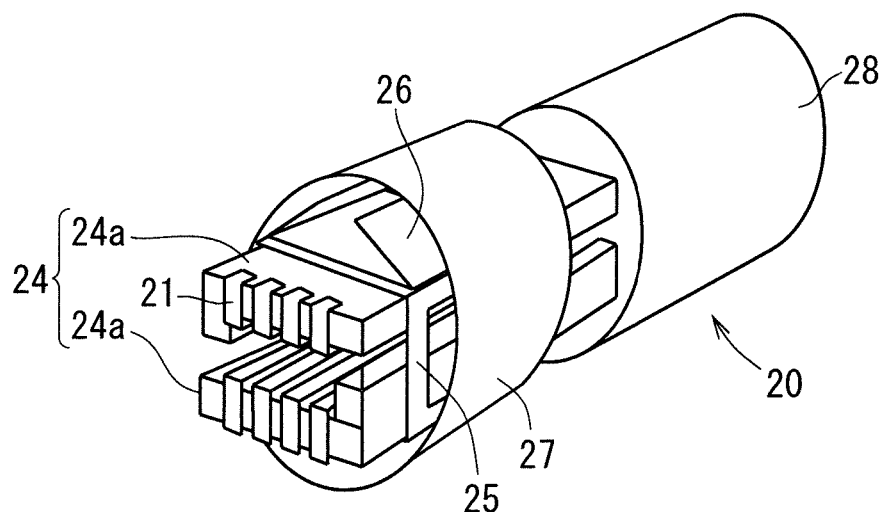
FIGS. 4A, 4B, and 4C are diagrams for description of a more detailed configuration of a contact member 20.
Figure 4B:
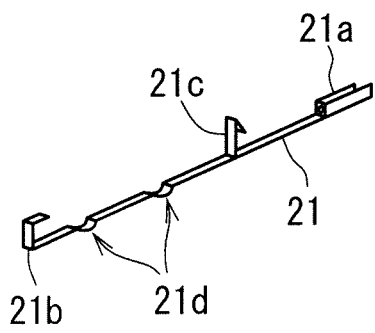
Figure 4C:
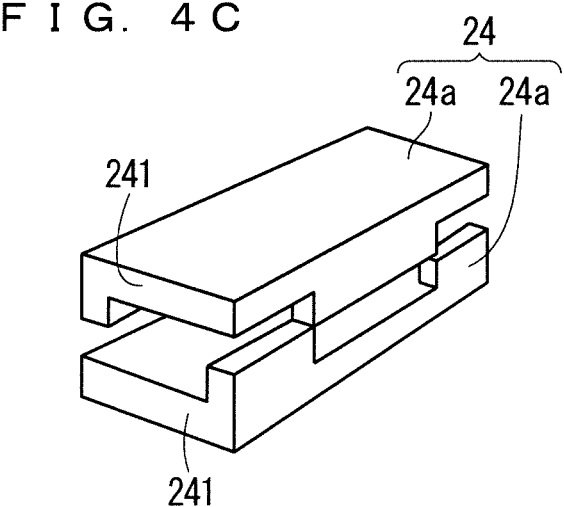
Figure 5:
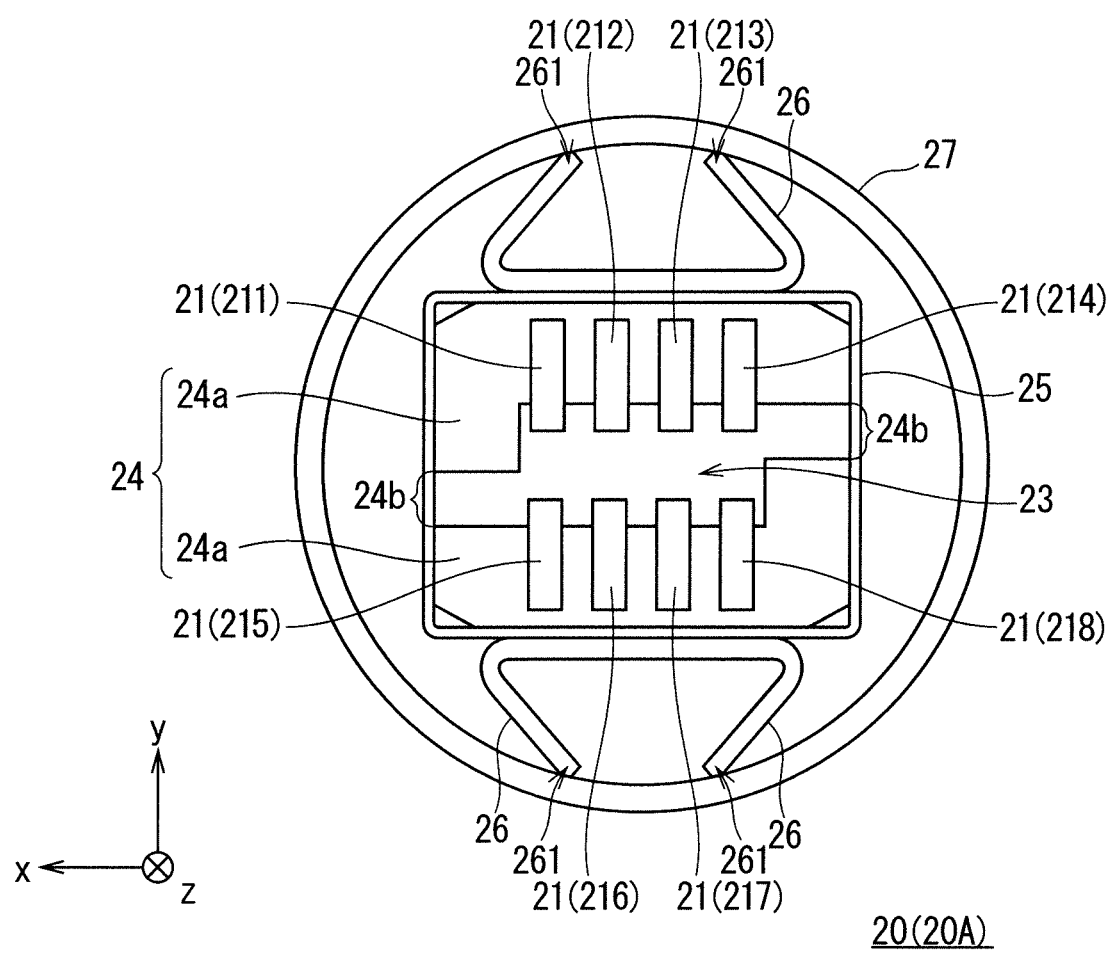
FIG. 5 is a front view of an end part 20A of the contact member 20 on an insertion port 23 side.

FIGS. 4A, 4B, and 4C are diagrams for description of a more detailed configuration of the contact member 20. FIG. 4A is a perspective view of the contact member 20, and FIGS. 4B and C are perspective views of each contact-point member 21 and the housing 24, respectively, included in the contact member 20. FIG. 5 is a front view of an end part 20A of the contact member 20 on the insertion port 23 side. The end part 20A is a lowest end part of the contact member 20 when the wiring side assembly 30 is disposed and held on a conveyance pallet PT. The xyz coordinates in FIG. 5 correspond to the xyz coordinates (refer to FIG. 6, for example) of an assembling apparatus 1000 to be described later.

The contact member 20 has a configuration in which the plurality of contact-point members 21 connected with the lead wires inserted in the grommet 28 are hooked on each of a pair of housing members 24a constituting the housing 24 and disposed opposite to each other, and a metal fitting 25 having a pressing spring 26 and the swaging ring 27 are assembled on the outer periphery of the housing 24.

In the wiring side assembly 30, the contact-point members 21 of the contact member 20 are electrically connected with the respective connector pins 29a of the connector 29 through the lead wires (not illustrated) housed in the wire harness 22. When the gas sensor main body 10 and the contact member 20 are integrated, the electrode terminals 1a of the sensor element 1 are connected with the respective contact-point members 21, and accordingly, electrical connection is obtained between the electrode terminals 1a of the sensor element 1 and the respective connector pins 29a of the connector 29.

As illustrated in FIG. 5, the end part 20A of the contact member 20 has a point-symmetric configuration. FIG. 5 exemplarily illustrates a case in which four of the eight contact-point members 21 (211 to 218) are provided to each housing member 24a in accordance with the number of the connector pins 29a of the connector 29 exemplarily illustrated in FIG. 2, and the disposition and number of the electrode terminals 1a in the sensor element 1 exemplarily illustrated in FIG. 3.

As illustrated in FIG. 4B, each contact-point member 21 includes a crimp part 21a connected with a leading end part of the corresponding lead wire, a first hooking part 21b and a second hooking part 21c hooked at predetermined positions of the housing members 24a, and a protrusion part 21d that biases the sensor element 1 and functions as a contact point in contact with the electrode terminals 1a of the sensor element 1 when the sensor element 1 is inserted in the insertion port.

Connection between the lead wire and the contact-point member 21 is obtained by swaging the crimp part 21a from outside while the leading end part of the lead wire is sandwiched in the crimp part 21a.

The first hooking part 21b of each contact-point member 21 is hooked to a first hooked part 241 provided at one end part of the corresponding housing member 24a. Thus, the shapes of the first hooking part 21b and the first hooked part 241 are determined so that the hooked state is excellently held. In other words, the first hooking part 21b is fabricated to have a shape in accordance with a side sectional shape of the first hooked part 241. The second hooking part 21c is hooked to the housing members 24a by being inserted to a second hooked part (not illustrated) provided at a central part of the housing member 24a.

The housing members 24a have substantially identical sectional shapes, and at assembly, are separated from each other so that a space having a rectangular sectional shape as the insertion port 23 is formed therebetween. Thus, a gap 24b is provided at end parts of the two housing members 24a as illustrated in FIG. 5. In other words, the housing members 24a have shapes obtained by dividing, into two, a housing having a rectangular sectional shape and including a space inside. After assembly in a manner as described above, the vicinities of leading end parts (vicinity of an end part of the insertion port 23) of the housing members 24a can displace upward and downward within predetermined ranges when the housing members 24a receive external forces upward and downward in FIG. 5 from inside of the insertion port 23. The sensor element 1 is fixed to the contact member 20 when the pair of housing members 24a receive external forces thereby to pinch the sensor element 1 at the insertion port 23.

The pressing spring 26 is a plate spring member having a trapezoid sectional shape with no upper base part, and generates elastic force as restoring force against external force acting on a free end part 261 thereof.

The metal fitting 25 has, in addition to a function to fix the pressing spring 26, a function to maintain the assembly state of the housing 24, more specifically, a state in which the insertion port 23 is formed until the sensor element 1 is pinched and fixed. In other words, the metal fitting 25 is a restriction member configured to restrict the pair of housing members 24a to inside of a predetermined disposition range so that the formation state of the insertion port 23 is maintained. Since the metal fitting 25 and the housing 24 are subjected to assembling, positional shift is prevented from occurring between each contact-point member 21 of the sensor element 1 (more specifically, the protrusion part 21d thereof) and the corresponding electrode terminals 1a at fixation of the sensor element 1. Thus, the metal fitting 25 also has a function to restrict the disposition range of the sensor element 1 at the fixation by pinching.

At integration of the gas sensor main body 10 and the contact member 20, the swaging ring 27 is swaged while the sensor element 1 is inserted in the insertion port 23 of the housing 24. Specifically, the swaging ring 27 is deformed to a reduced size by external force. Accordingly, the gap of the insertion port 23 of the housing 24 is reduced so that the sensor element 1 is biased in the up and down directions by the contact-point members 21 provided to the housing members 24a. As a result, the sensor element 1 is fixed by pinching between the pair of housing members 24a. In this case, the protrusion part 21d of each contact-point member 21 contacts with the corresponding electrode terminal 1a, and accordingly, in the gas sensor 100, external electric conduction of the sensor element 1 is achieved through the lead wires connected with the contact-point members 21, and further, the connector 29 connected with the lead wires.

Schematic Configuration of Assembling Apparatus

Figure 6:
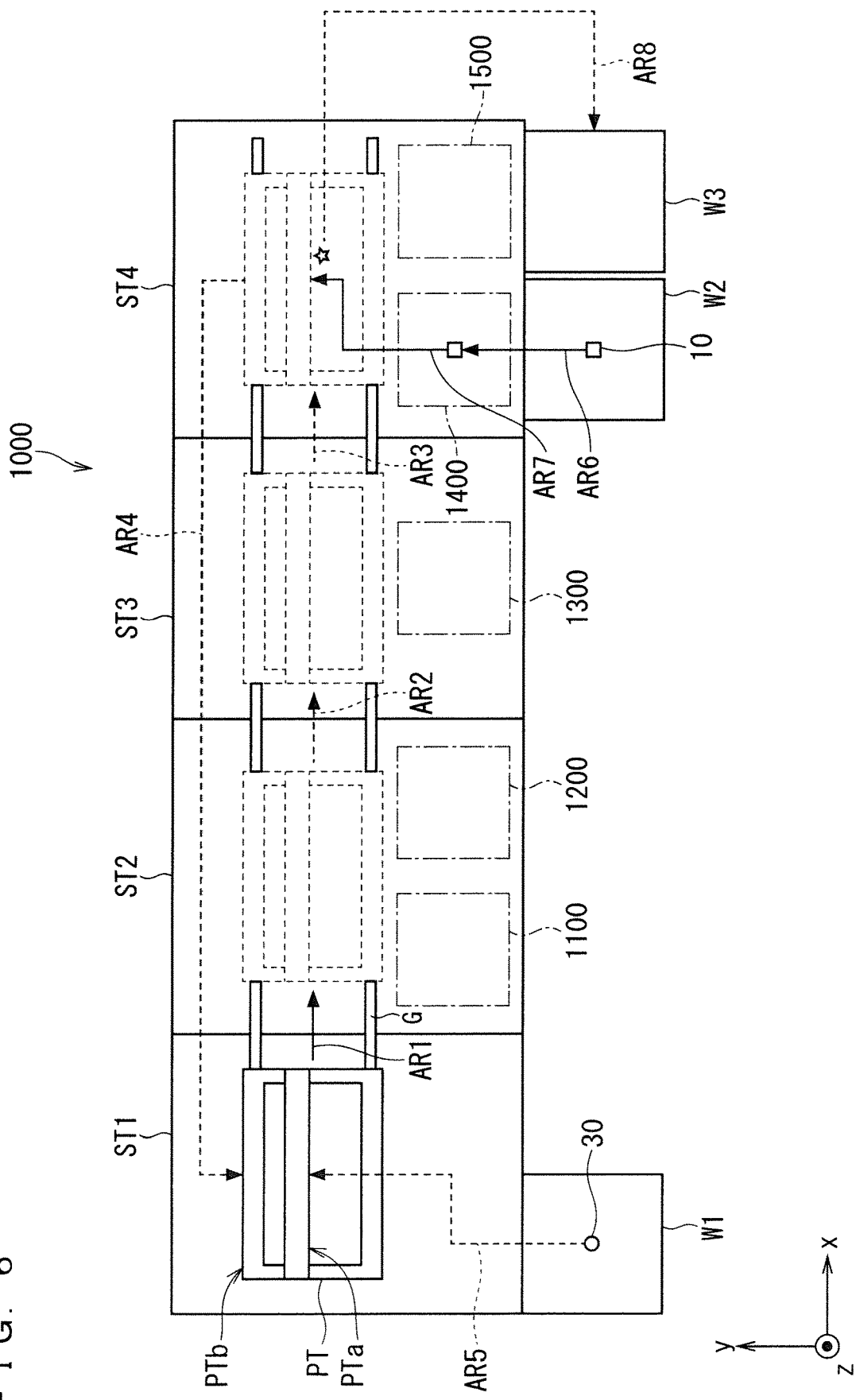
FIG. 6 is a diagram illustrating a schematic configuration of an assembling apparatus 1000.
Figure 7:
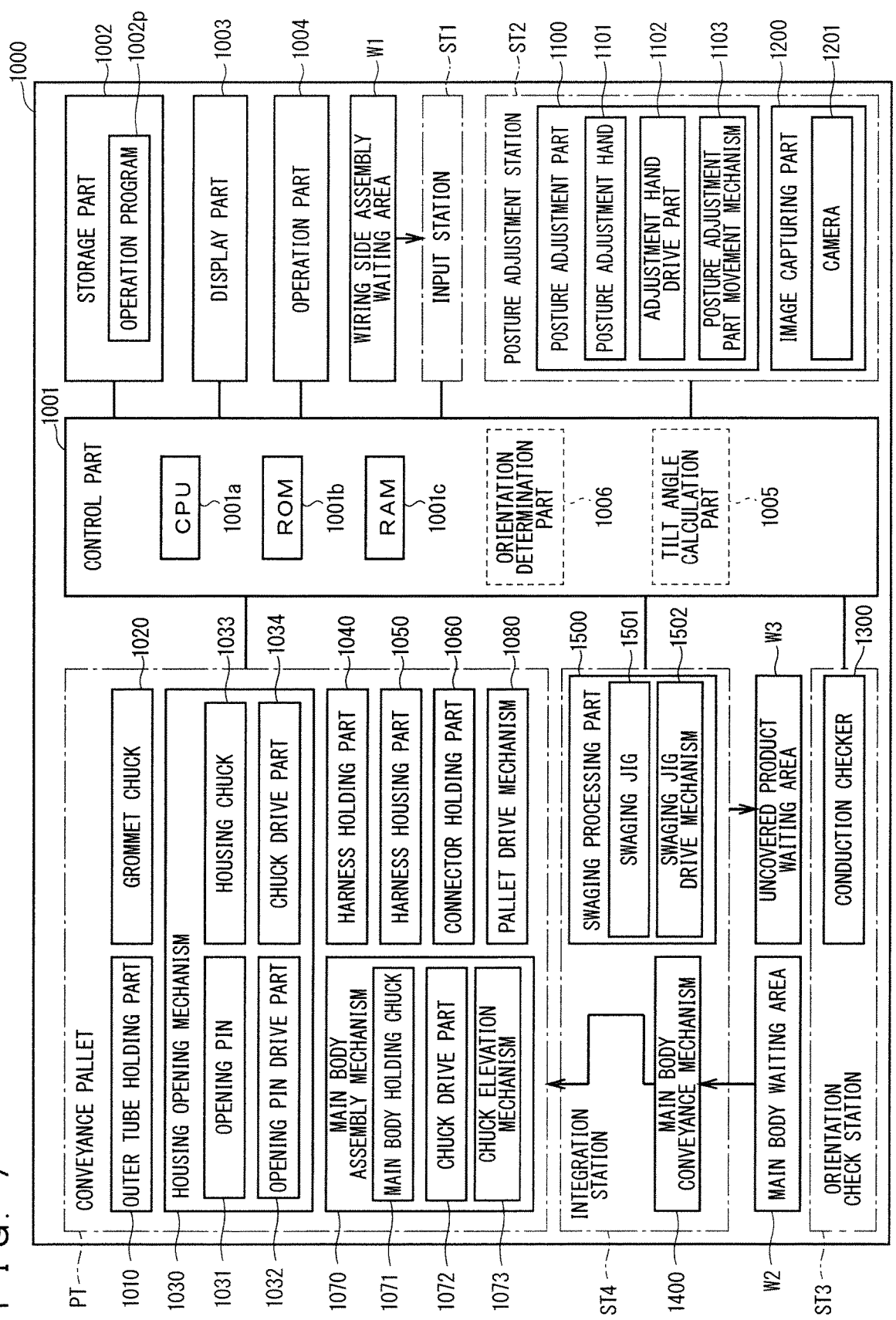
FIG. 7 is a block diagram illustrating more detailed components of the assembling apparatus 1000.

The following describes the assembling apparatus 1000 configured to assemble the gas sensor 100, more specifically, integrate the gas sensor main body 10 and the contact member 20 in the present embodiment. FIG. 6 is a diagram illustrating a schematic configuration of the assembling apparatus 1000. FIG. 7 is a block diagram illustrating more detailed components of the assembling apparatus 1000.

The assembling apparatus 1000 mainly includes the conveyance pallet PT, an input station ST1, a posture adjustment station ST2, an orientation check station ST3, and an integration station ST4.

The input station ST1, the posture adjustment station ST2, the orientation check station ST3, and the integration station ST4 are continuously provided in the stated order in one direction in a horizontal plane. The conveyance pallet PT is movable between the input station ST1, the posture adjustment station ST2, the orientation check station ST3, and the integration station ST4 while holding the wiring side assembly 30.

FIG. 6 includes right-handed xyz coordinates in which an x-axis direction is defined to be the direction (station continuation direction) in which the input station ST1 to the integration station ST4 are continuously provided, the positive direction of the x-axis is defined to be a direction toward the integration station ST4 from the input station ST1, a y-axis direction is defined to be a direction orthogonal to the x-axis direction in a horizontal plane, and a z-axis direction is defined to be the vertical direction. Operation of each component of the assembling apparatus 1000 is performed with reference to a coordinate system determined by the xyz coordinates. In other words, the coordinate system is a reference coordinate system of the assembling apparatus 1000 according to the present embodiment.

In the assembling apparatus 1000 according to the present embodiment, operation of each component provided to each station is performed by using the station continuation direction as a reference direction, in other words, the above-described xyz coordinate system as a reference coordinate system.

However, disposition of each component in FIG. 6 is merely conceptual and does not necessarily indicate an actual disposed position except for the described above configuration in which the input station ST1, the posture adjustment station ST2, the orientation check station ST3, and the integration station ST4 are continuously provided in the stated order and the conveyance pallet PT moves between the stations.

The conveyance pallet PT is provided to convey the wiring side assembly 30 including the contact member 20. The conveyance pallet PT schematically has a configuration in which a holding part PTa on which the wiring side assembly 30 is disposed and held is erected on a base PTb, and the base PTb is guided by a guide G provided in the x-axis direction. With this configuration, the conveyance pallet PT can sequentially move from the input station ST1 to the posture adjustment station ST2, the orientation check station ST3, and the integration station ST4 as illustrated with arrows AR1, AR2, and AR3 in FIG. 6. Having reached the integration station ST4, the conveyance pallet PT is returned to the input station ST1 again as illustrated with arrow AR4. Although the single conveyance pallet PT moves in FIG. 6, a plurality of conveyance pallets PT may simultaneously or independently move.

The input station ST1 is a site at which processing of disposing and holding the wiring side assembly 30 at the holding part PTa of the conveyance pallet PT is performed in a state in which the conveyance pallet PT is disposed.

The posture adjustment station ST2 is a site at which posture adjustment processing and opening securing processing are performed to reliably perform insertion of the sensor element 1 into the insertion port 23 of the housing 24 at the integration station ST4 at a later stage. The posture adjustment station ST2 mainly includes a posture adjustment part 1100 and an image capturing part 1200.

The posture adjustment processing is processing of adjusting the posture of the contact member 20 in the wiring side assembly 30 having held on the conveyance pallet PT at the input station ST1 to eliminate a tilt thereof in a horizontal plane, and adjusting the posture to a predetermined insertion possible posture.

More specifically, in the posture adjustment processing, the posture of the contact member 20 in a horizontal plane (xy plane) is adjusted so that, as illustrated in FIG. 5, the pair of housing members 24a included in the housing 24 are disposed opposite to each other in the y-axis direction of the assembling apparatus 1000 and the insertion port 23 formed between the pair of housing members 24a and into which the sensor element 1 is inserted is disposed in the x-axis direction of the assembling apparatus 1000. The posture after the adjustment is the insertion possible posture. In other words, the insertion possible posture is the posture of the contact member 20 in a state in which the insertion port 23 extends in the x-axis direction and the end parts of the pair of housing members 24a are separated from each other in the y-axis direction to form the two gaps 24b along the x-axis direction.

Since the end part 20A of the contact member 20 has a point-symmetric configuration as illustrated in FIG. 5 but the contact-point members 21 (211 to 214) provided above the insertion port 23 in FIG. 5 and the contact-point members 21 (215 to 218) provided below the insertion port 23 should be electrically connected with the different electrode terminals 1a of the sensor element 1, the insertion possible posture of the contact member 20 includes two postures of a posture illustrated in FIG. 5 and a posture obtained by inverting the posture by 180°. At integration with the gas sensor main body 10, the sensor element 1 needs to be inserted so that the contact-point members 21 are electrically connected with the electrode terminals 1a of the sensor element 1 in correct combinations, but in the present embodiment, the two postures are not distinguished from each other but both referred to as the insertion possible posture. For sake of simplicity, the orientation of the contact member 20 in the posture illustrated in FIG. 5 is referred to as a positive orientation, and the orientation of the contact member 20 in a posture inverted from the posture illustrated in FIG. 5 by 180° is referred to as an opposite orientation.

The opening securing processing is processing of maintaining the opening of the insertion port 23 of the housing 24 in the contact member 20 already in the insertion possible posture, until the sensor element 1 is inserted into the insertion port 23.

In the assembling apparatus 1000 according to the present embodiment, the contact member 20 is adjusted to the insertion possible posture in advance and the opening state of the insertion port 23 of the contact member 20 in the insertion possible posture is maintained by the opening securing processing before the gas sensor main body 10 and the contact member 20 are integrated with each other by inserting the sensor element 1 of the gas sensor main body 10 into the insertion port 23 of the contact member 20, thereby excellently reducing the occurrence of failure such as contact of the sensor element 1 with the housing members 24a when the sensor element 1 is inserted into the insertion port 23.

The reliability of the opening securing processing is increased by performing the opening securing processing on the contact member 20 in which the insertion possible posture has been achieved at the posture adjustment position.

The orientation check station ST3 is a site at which processing of checking the disposition orientation of the contact member 20 is performed. The orientation check station ST3 mainly includes a conduction checker 1300.

The integration station ST4 is a site at which the gas sensor main body 10 and the contact member 20 of the wiring side assembly 30 are integrated with each other by inserting the sensor element 1 of the gas sensor main body 10 into the insertion port 23 of the contact member 20.

The integration station ST4 mainly includes a main body conveyance mechanism 1400 configured to convey the gas sensor main body 10, and a swage processing part 1500 configured to swage the swaging ring 27 by pressing from outside while the sensor element 1 is inserted in the insertion port 23.

The assembling apparatus 1000 further includes a wiring side assembly waiting area W1, a main body waiting area W2, and an uncovered product waiting area W3.

The wiring side assembly waiting area W1 is an area at which the wiring side assembly 30 newly provided to assembly at the assembling apparatus 1000 is prepared (stocked). As illustrated with arrow AR5 in FIG. 6, the wiring side assembly 30 (illustrated as a circle in FIG. 6) acquired from the wiring side assembly waiting area W1 is feeded to the input station ST1 to be disposed and held on the conveyance pallet PT.

The main body waiting area W2 is an area at which the gas sensor main body 10 to be integrated with the contact member 20 is prepared (stocked). The gas sensor main body 10 (illustrated as a rectangle in FIG. 6) prepared at the main body waiting area W2 is acquired by the main body conveyance mechanism 1400 as illustrated with arrow AR6 in FIG. 6, and further feeded to the integration station ST4 by the main body conveyance mechanism 1400 as illustrated with arrow AR7 to be integrated with the contact member 20.

The uncovered product waiting area W3 is an area at which the uncovered product 100c as the gas sensor 100 obtained through integration of the gas sensor main body 10 and the contact member 20 and yet to be covered by the outer tube 4 is placed. The uncovered product 100α (illustrated as a star in FIG. 6) is acquired from the uncovered product waiting area W3 and provided to processing performed outside of the assembling apparatus 1000 at a later stage as illustrated with arrow AR8 in FIG. 6.

As illustrated in FIG. 7, the assembling apparatus 1000 includes, in addition to the above-described components: a control part 1001 including a CPU 1001a, a ROM 1001b, and a RAM 1001c and configured to control the entire operation of the assembling apparatus 1000; a storage part 1002 configured to store, for example, an operation program 1002p for the assembling apparatus 1000 and operation condition data (not illustrated); a display part 1003 including a display, a meter, and a gauges and the like configured to display, for example, various kinds of operation menus and operation states of the assembling apparatus 1000; and an operation part 1004 as an input interface including a switch, a button, and a touch panel for providing, for example, various kinds of execution instructions to the assembling apparatus 1000. In the assembling apparatus 1000, an assembly operation to be described later is automatically performed through the execution of the operation program 1002p by the control part 1001. In addition, a tilt angle calculation part 1005 and an orientation determination part 1006 are virtually implemented as functional components at the control part 1001.

The tilt angle calculation part 1005 performs processing of calculating the tilt angle of the contact member 20 based on an image for calculation captured by the image capturing part 1200 at posture adjustment of the contact member 20 performed at the posture adjustment station ST2.

The orientation determination part 1006 performs processing of determining whether the disposition orientation of the contact member 20 of the wiring side assembly 30 (more specifically, the housing 24 thereof) held on the conveyance pallet PT is the positive orientation or the opposite orientation based on a result of conduction check between each contact-point member 21 and the connector 29 performed by the conduction checker 1300 at the orientation check station ST3.

Detailed Configuration of Assembling Apparatus and Assembly Processing

Figure 8:
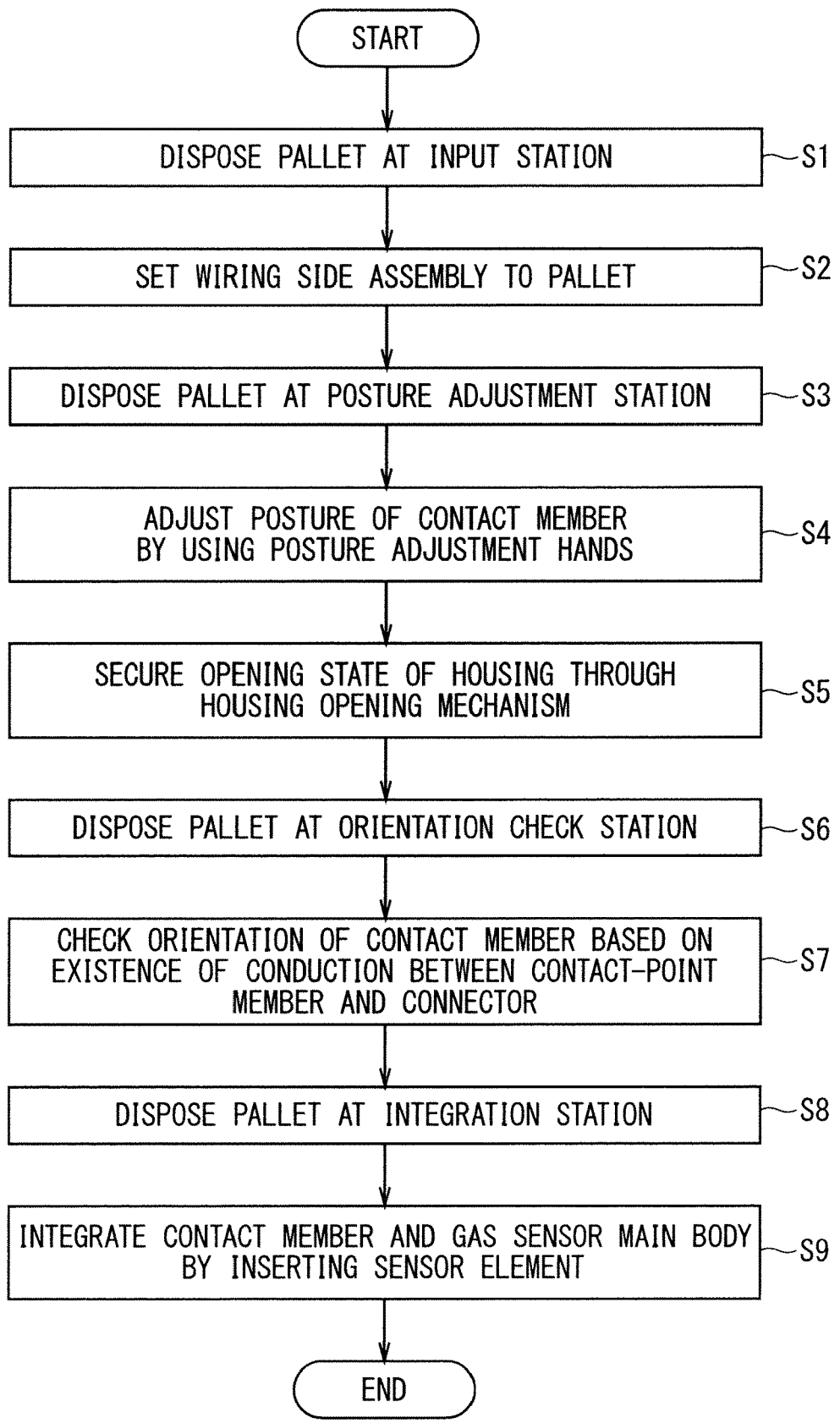
FIG. 8 is a diagram illustrating the procedure of assembly processing performed at the assembling apparatus 1000.

The following describes a more detailed configuration of the assembling apparatus 1000 together with the procedure of processing of assembling the gas sensor 100, specifically, the procedure of processing of integrating the gas sensor main body 10 and the contact member 20, which is performed at the assembling apparatus 1000. FIG. 8 is a diagram illustrating the procedure of the assembly processing performed at the assembling apparatus 1000.

Configuration of Conveyance Pallet and Disposition of Wiring Side Assembly at Input Station At the assembly processing, first, the conveyance pallet PT is disposed at the input station ST1 through operation control by the control part 1001 (step S1), and the wiring side assembly 30 as an assembly target is disposed and held on the conveyance pallet PT (more specifically, the holding part PTa thereof) (step S2). This is achieved in a way that the operator of the assembling apparatus 1000 takes out the wiring side assembly 30 from the wiring side assembly waiting area W1 and then respective components thereof are holded and fixed at predetermined positions on the conveyance pallet PT.

Figure 9:
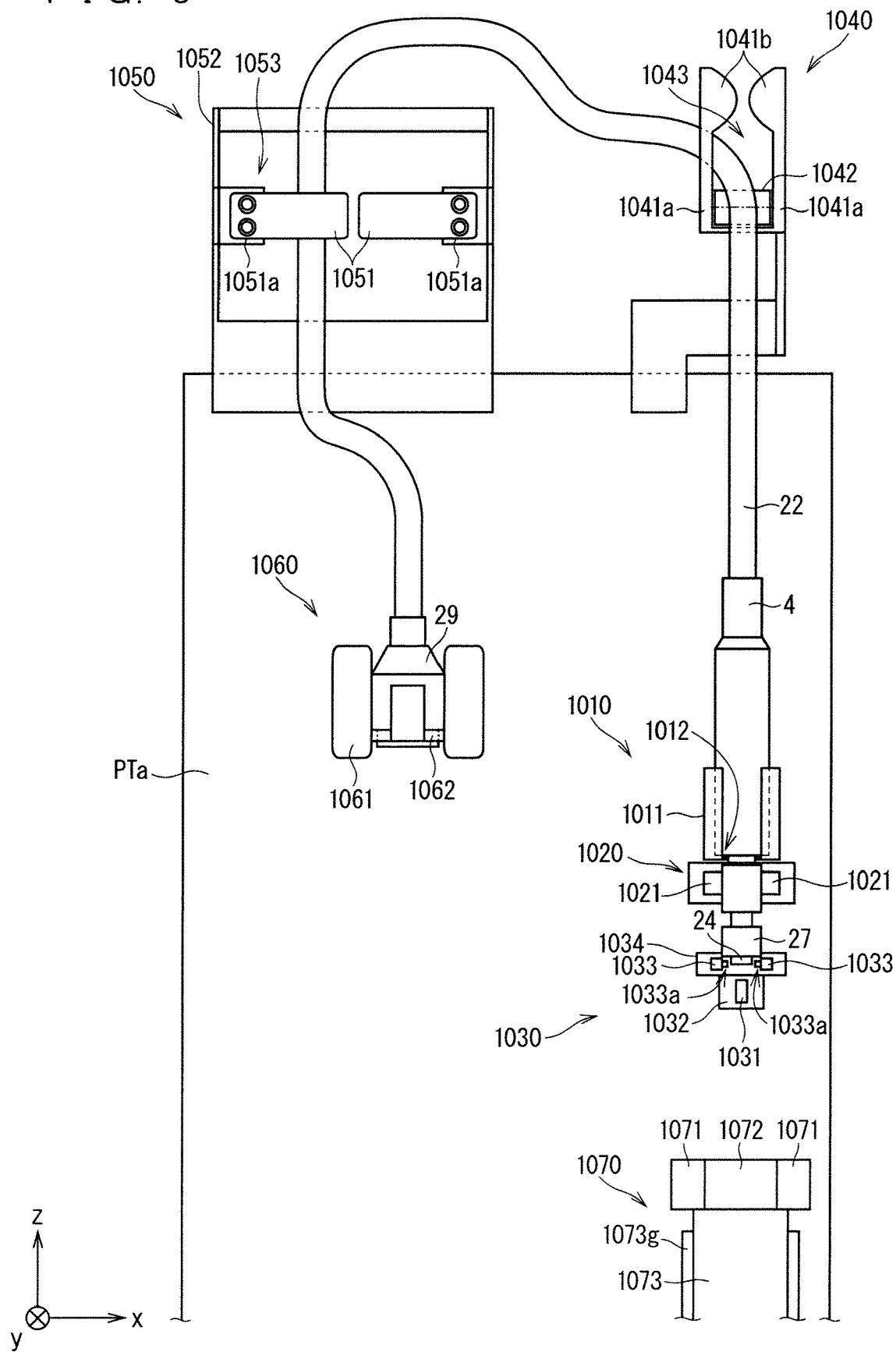
FIG. 9 is a main part front view of a holding part PTa of a conveyance pallet PT after the wiring side assembly 30 is disposed at an input station ST1.

FIG. 9 is a main part front view of the holding part PTa of the conveyance pallet PT after the wiring side assembly 30 is disposed at the input station ST1. The front side of the conveyance pallet PT points to the negative side in the y-axis direction in FIG. 6, and FIG. 9 includes an xyz coordinate system same as that in FIG. 6.

As illustrated in FIG. 9, the conveyance pallet PT includes, at the holding part PTa, an outer tube holding part 1010, grommet chucks 1020, a housing opening mechanism 1030, a harness holding part 1040, a harness housing part 1050, and a connector holding part 1060 as sites at which each component of the wiring side assembly 30 is held and fixed. In addition, the holding part PTa of the conveyance pallet PT is further provided with a main body assembly mechanism 1070 configured to perform processing (integration processing) of integrating the gas sensor main body 10 with the contact member 20 of the wiring side assembly 30. The main body assembly mechanism 1070 will be described later in detail.

The outer tube holding part 1010 holds the outer tube 4 at the conveyance pallet PT. The outer tube holding part 1010 includes an insertion part 1011 to which the outer tube 4, through which the wire harness 22 is penetrated in the wiring side assembly 30, is inserted vertically downward from above in a posture that the longitudinal direction thereof is aligned with the vertical direction, and a support part 1012 configured to support, from below, the outer tube 4 inserted to the insertion part 1011, letting a part extending from the grommet 28 to the insertion port 23 of the housing 24 protrude downward.

When the outer tube holding part 1010 holds the outer tube 4 in such a manner, the contact member 20 is disposed and held in the conveyance pallet PT with the end part 20A of the housing 24 being at a lowest end part.

The grommet chucks 1020 are a mechanism provided below the outer tube holding part 1010 and capable of holding the grommet 28. The grommet chucks 1020 hold the grommet 28 by grasping (chucks) the grommet 28 from sides through a pair of grasping parts 1021. FIG. 9 illustrates a state in which the grommet chucked 1020 hold the grommet 28. The grommet chucks 1020 may employ the well-known various kinds of configurations as long as grasping and releasing of the grommet 28 are performed under control of the control part 1001. In the assembling apparatus 1000 according to the present embodiment, the grommet chucks 1020 are not capable of moving the grommet 28 being grasped by the grommet chucks 1020 nor changing the posture thereof, but is only capable of performing grasping and releasing from the grasped state.

The housing opening mechanism 1030 is a site provided below the grommet chucks 1020 at the conveyance pallet PT and configured to secure, before integration of the contact member 20 and the gas sensor main body 10, the opening state of the insertion port 23 formed at the end part 20A of the housing 24.

The housing opening mechanism 1030 includes an opening pin 1031, an opening pin drive part 1032 configured to move the opening pin 1031, a pair of housing chucks 1033, and a chuck drive part 1034 configured to move the housing chucks 1033.

The opening pin 1031 is freely movable back and forth in the z-axis direction through actuation of the opening pin drive part 1032, and provided so that the leading end part thereof enters into the insertion port 23 of the housing 24 when the opening pin 1031 is moved in the z-axis positive direction.

The pair of housing chucks 1033 are members that are disposed opposite to each other in the x-axis direction at positions symmetric with respect to the disposed position of the housing 24 when the contact member 20 is disposed at the conveyance pallet PT, are freely movable back and forth in the x-axis direction through actuation of the chuck drive part 1034, are capable of grasping (chucking) the housing 24 by moving in a direction in which the housing chucks 1033 approach to each other. FIG. 9 illustrates a state in which the housing 24 is not held by the housing opening mechanism 1030.

More specifically, the pair of housing chucks 1033 each include a claw part 1033a at a leading end thereof in the traveling direction. The claw parts 1033a are provided so that the disposed positions thereof in the y-axis direction coincide with the positions of the two gaps 24b (FIG. 5) of the pair of housing members 24a while the sensor element 1 or the opening pin 1031 is inserted in the insertion port 23 of the housing 24. The claw parts 1033a are inserted into the gaps 24b before the sensor element 1 is inserted into the insertion port 23. The thicknesses of the claw parts 1033a are substantially equal to maximum values of the gaps 24b. As illustrated in FIG. 5, the two gaps 24b are formed at different positions in the y-axis direction, and accordingly, the claw parts 1033a of the respective housing chucks 1033 are provided at different positions in the y-axis direction.

In the housing opening mechanism 1030, the opening pin drive part 1032 and the chuck drive part 1034 are constituted by servo mechanisms, and the opening pin 1031 and the pair of housing chucks 1033 are moved in accordance with control of the opening pin drive part 1032 and the chuck drive part 1034 by the control part 1001.

Although not illustrated in FIG. 9, in the actual conveyance pallet PT, a sufficient space is provided below the housing chucks 1033 so that the gas sensor main body 10 can approach to the contact member 20 from vertically below at integration of the contact member 20 with the gas sensor main body 10 to be described later.

The harness holding part 1040 and the harness housing part 1050 are sites provided to restrict (hold or house) the wire harness 22 (mainly a part thereof other than both end parts) extending from the outer tube 4 to the connector 29 to inside of a predetermined region in order to avoid interference at integration of the gas sensor main body 10 and the contact member 20, or also to avoid changes of the position and posture of the contact member 20 due to the weight of the wire harness 22.

The harness holding part 1040 is provided above the outer tube holding part 1010, and includes a pair of arms 1041 and a roller 1042 provided between base end parts 1041a of the arms 1041.

The pair of arms 1041 are provided in plate spring shapes extending upward from the base end parts 1041a with the base end parts 1041a as fixed ends, and include guide parts 1041b protruding in curved or polygonal shapes near upper end parts as free ends. The pair of arms 1041 are disposed opposite to each other so that the guide parts 1041b thereof are separated by a distance substantially equal to or slightly smaller than the sectional diameter of the wire harness 22. With this configuration, each arm 1041 displaces in one plane including the x-axis direction in response to external force with the base end part 1041a as a pivot.

In the harness holding part 1040, the wire harness 22 is restricted to a harness holding region 1043 surrounded by the pair of arms 1041 and the roller 1042. Specifically, the operator of the assembling apparatus 1000 exerts external force on the two guide parts 1041b through the wire harness 22 by contacting the wire harness 22 with the two guide parts 1041b so that the wire harness 22 passes between the two guide parts 1041b from outside of the harness holding region 1043 (from above in FIG. 9), and accordingly, the gap between the two guide parts 1041b is expanded by the wire harness 22. As a result, the wire harness 22 enters into the harness holding region 1043. Once the wire harness 22 has entered into the harness holding region 1043 and become separated from the two guide parts 1041b, the two guide parts 1041b do not receive the external force any more but return to the original positions. Accordingly, the wire harness 22 is restricted to inside of the harness holding region 1043. Thus, the wire harness 22 is not easily removed from the harness holding region 1043 unless the operator intentionally exerts force on the two guide parts 1041b from inside of the harness holding region 1043 through the wire harness 22.

However, the holding of the wire harness 22 in the harness holding part 1040 does not completely fix the wire harness 22 nor prevent movement thereof, but the wire harness 22 is movable in any possible behavior in the harness holding region 1043.

The roller 1042 is provided rotatably about a rotational axis extending in the x-axis direction. The roller 1042 is provided to smooth movement of the wire harness 22 when the wire harness 22 is present in the harness holding region 1043.

The harness housing part 1050 is provided on a side of the harness holding part 1040 to house a surplus part of the wire harness 22 between the harness holding part 1040 and the connector holding part 1060.

The harness housing part 1050 includes a pair of arms 1051 and a frame body 1052. The pair of arms 1051 are each an elastic body having a plate spring shape with a base end part 1051a as a fixed end and attached to the frame body 1052. The pair of arms 1051 are disposed opposite to each other in the x-axis direction in a zx plane so that the pair of arms 1051 are separated from each other by a distance substantially equal to or slightly smaller than the sectional diameter of the wire harness 22. With this configuration, each arm 1051 displaces in the y-axis direction in response to external force with the base end part 1051a as a pivot.

In the harness housing part 1050, the wire harness 22 is housed in a harness house region 1053 surrounded by the pair of arms 1051 and the frame body 1052. Specifically, the operator of the assembling apparatus 1000 exerts external force on the two arms 1051 from outside of the harness house region 1053 (from the front side in FIG. 9) through the wire harness 22 by contacting the wire harness 22 with the two arms 1051 so that the wire harness 22 passes between the two arms 1051, and accordingly, the two arms 1051 are curved toward the frame body 1052 (the back side in FIG. 9) by the wire harness 22, with the base end parts 1051a as pivots. As a result, the wire harness 22 enters into the harness house region 1053. Once the wire harness 22 has entered into the harness holding region 1043 and become separated from the two arms 1051, the two arms 1051 do not receive the external force any more but return to the original positions. Accordingly, the wire harness 22 is housed in the harness house region 1053. Thus, the wire harness 22 is not easily removed from the harness house region 1053 unless the operator intentionally exerts force on the two arms 1051 from inside of the harness house region 1053 through the wire harness 22.

However, the housing of the wire harness 22 in the harness housing part 1050 does not completely fix the wire harness 22 nor prevent movement thereof, but the wire harness 22 is movable in any possible behavior in the harness house region 1053.

The wire harness 22 may be disposed with slack as appropriate in the range of the harness holding part 1040 to the connector holding part 1060, and at least does not need to be disposed with tension. Thus, the harness housing part 1050 does not need to be used in a case that the wire harness 22 is short and excellently held only by the harness holding part 1040.

On the other hand, in a case that the wire harness 22 is long, for example, the wire harness 22 may be partially wound or bound when housed in the harness housing part 1050. The harness housing part 1050 is preferably configured to excellently house the wire harness 22 thus wound or bound.

The connector holding part 1060 is a site that is provided below the harness housing part 1050 and at which the connector 29 is held and fixed. The connector holding part 1060 includes an insertion part 1061 to which the connector 29 is inserted downward vertically from above, and a support part 1062 configured to support from below, with exposure, at least some of the connector pins 29a of the connector 29 (refer to FIG. 2) inserted to the insertion part 1061. The exposure of at least some of the connector pins 29a allows the conduction checker 1300 at the orientation check station ST3 to be described later to access to the connector pins 29a thus exposed. FIG. 2 exemplarily illustrates a case in which the connector 29 includes the eight connector pins 29a. In a case that the connector 29 is anisotropic in the shape of the leading end part or disposition of the connector pins 29a, the insertion part 1061 of the connector holding part 1060 is preferably configured so that the connector 29 is inserted only in a particular direction.

When the wiring side assembly 30 is disposed and held on the holding part PTa of the conveyance pallet PT having a configuration as described above at the input station ST1 by the operator of the assembling apparatus 1000, first, the grasping parts 1021 of the grommet chucks 1020 and the housing chucks 1033 of the housing opening mechanism 1030 are both opened. Then, the outer tube 4 is held by the outer tube holding part 1010, and the connector 29 is held by the connector holding part 1060, and subsequently, the wire harness 22 is held by the harness holding part 1040 and housed in the harness housing part 1050. Thereafter, the grommet 28 is grasped by the grommet chucks 1020. However, at the input station ST1, grasping (chucking) of the housing 24 by the housing chucks 1033 is not performed, and the housing chucks 1033 is kept opened until the opening securing processing to be described later is performed at the posture adjustment station ST2.

When the wiring side assembly 30 is disposed on the conveyance pallet PT by the operator of the assembling apparatus 1000, in particular, when the grommet 28 is grasped by the grommet chucks 1020, it is suffice to dispose, through visual recognition, the grommet 28 in a posture that the insertion port 23 of the housing 24 is disposed substantially in the x-axis direction. In addition, the central axis of the contact member 20 does not need to coincide with a symmetrical axis L3 (refer to FIG. 10B) of the grommet chucks 1020. In other words, precise positioning is unnecessary when the grommet 28 is held by the grommet chucks 1020. This is because, in the assembling apparatus 1000 according to the present embodiment, the position and posture of the contact member 20 are adjusted through the posture adjustment processing to be described later in detail before integration of the contact member 20 of the wiring side assembly 30 and the gas sensor main body 10. Since the outer tube 4 is restricted by the outer tube holding part 1010 as described above, the disposition range of the contact member 20 (grommet 28) is limited, and the grommet chucks 1020 can grasp the grommet 28 as long as the grommet 28 is present in the range.

The contact member 20 and the wire harness 22 each have a symmetric shape with respect to the central axis thereof and the end part 20A of the contact member 20 has a point-symmetric configuration, but in reality, the contact member 20 has the positive orientation or the opposite orientation as described above. However, it is difficult for the operator of the assembling apparatus 1000 to identify the orientation with bare eyes. Thus, in the assembling apparatus 1000 according to the present embodiment, as described later, whether the disposition orientation of the contact member 20 on the conveyance pallet PT is the positive orientation or the opposite orientation is checked based on a result of conduction check at the orientation check station ST3 before integration of the contact member 20 and the gas sensor main body 10, and the orientation of the gas sensor main body 10 is determined in accordance with a result of the check before the gas sensor main body 10 is integrated with the contact member 20. Thus, the operator does not necessarily need to concern the posture of the contact member 20 at the disposition on the conveyance pallet PT at the input station ST1.

After the wiring side assembly 30 is disposed and held on the holding part PTa of the conveyance pallet PT at the input station ST1, the conveyance pallet PT is moved toward the posture adjustment station ST2 along the guide G by a pallet drive mechanism 1080 (not illustrated in FIG. 9) provided to the base PTb.

The movement of the conveyance pallet PT in the assembling apparatus 1000 is implemented through actuation of the pallet drive mechanism 1080 under control of the control part 1001. The pallet drive mechanism 1080 may be a well-known mechanism such as a linear slider or a ball screw. The conveyance pallet PT, the pallet drive mechanism 1080, and the guide G serve as a conveyance mechanism in the assembling apparatus 1000.

Configuration of Posture Adjustment Station

The posture adjustment station ST2 includes the posture adjustment part 1100 and the image capturing part 1200 as described above. The posture adjustment part 1100 is a site configured to hold the contact member 20 and adjust the posture thereof. The image capturing part 1200 is a site configured to capture an image for calculating the tilt angle of the contact member 20 before posture adjustment by the posture adjustment part 1100.

Figure 10A:
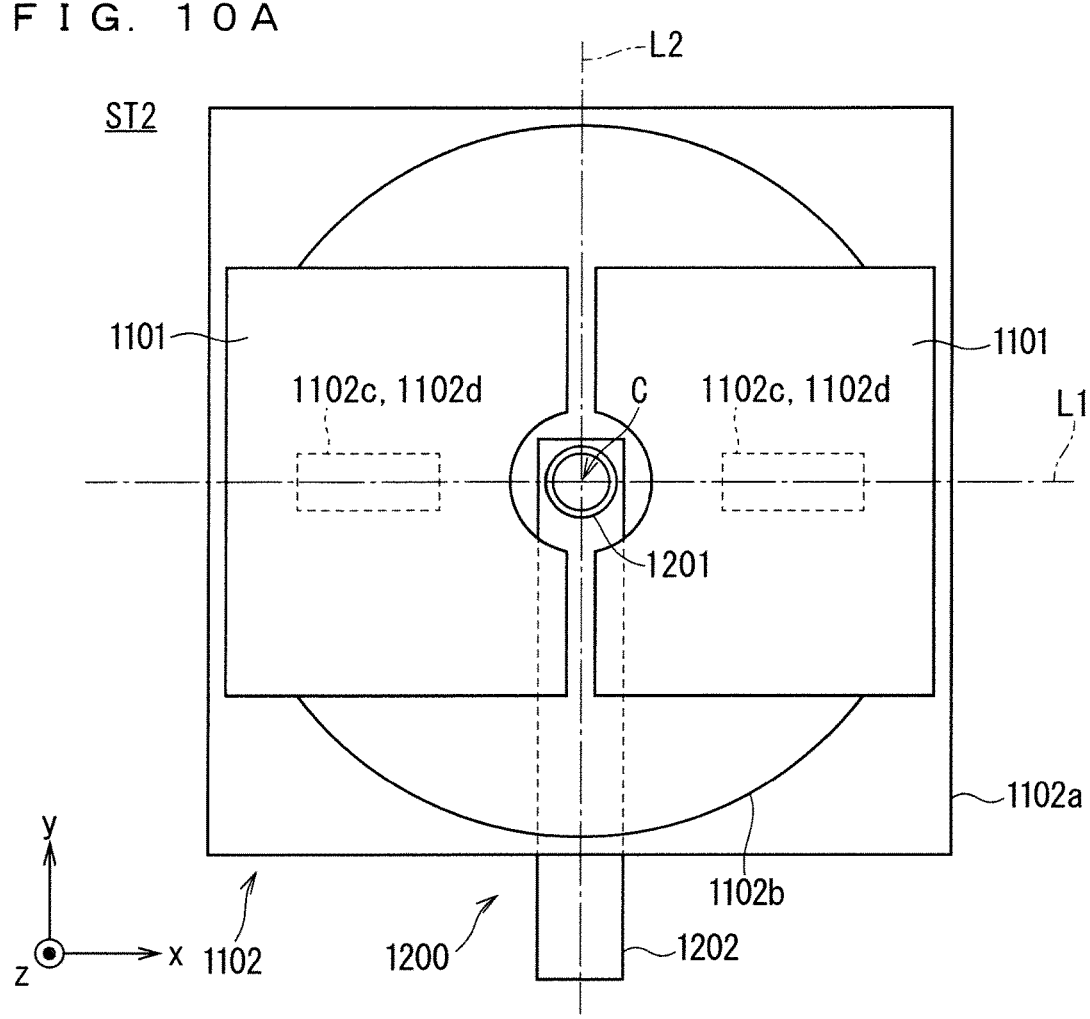
FIGS. 10A and 10B are diagrams illustrating schematic configurations of a posture adjustment part 1100 and an image capturing part 1200.
Figure 10B:
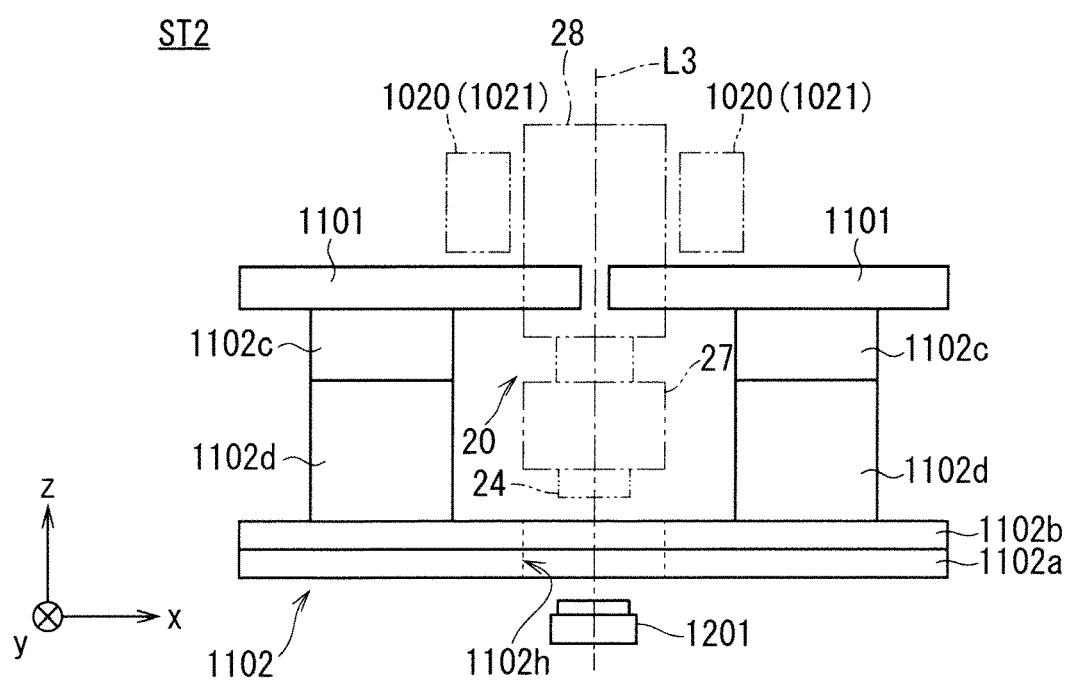

FIGS. 10A and 10B are diagrams illustrating schematic configurations of the posture adjustment part 1100 and the image capturing part 1200. More specifically, FIG. 10A is a top view illustrating the disposition relation between the posture adjustment part 1100 and the image capturing part 1200 at start of posture adjustment (when viewed from the positive z-axis direction side), and FIG. 10B is a side view thereof when viewed from the negative y-axis direction side.

To facilitate understanding of the disposition relation, FIG. 10A omits illustration of the contact member 20. In a state illustrated in FIG. 10B, the grommet chucks 1020 do not grasp the grommet 28. As described later, the actual disposed positions of the posture adjustment part 1100 and the image capturing part 1200, and the grasping status of the grommet 28 change in accordance with the processing statuses of the posture adjustment part 1100 and the image capturing part 1200.

The posture adjustment part 1100 includes a pair of posture adjustment hands 1101 capable of grasping the grommet 28 of the contact member 20 while the conveyance pallet PT is disposed at the posture adjustment station ST2, and an adjustment hand drive part 1102 configured to operate the posture adjustment hands 1101, and also includes a posture adjustment part movement mechanism 1103 (not illustrated in FIGS. 10A and 10B) configured to perform an operation to move the entire posture adjustment part 1100 in the y-axis direction.

The pair of posture adjustment hands 1101 include, at one end parts thereof facing to each other, concave grasping surfaces 1101a in accordance with the side surface shape of the grommet 28. The posture adjustment part 1100 is configured so that the adjustment hand drive part 1102 can be driven in accordance with a control instruction from the control part 1001 to cause the grasping surfaces 1101a of the pair of respective posture adjustment hands 1101 to contact with and grasp the grommet 28 and further to rotate the contact member 20 in a horizontal plane (xy plane) while maintaining this grasping state.

More specifically, the adjustment hand drive part 1102 includes a base part 1102a attached to the posture adjustment part movement mechanism 1103, a rotation part 1102b, and a pair of hand movement drive parts 1102c. The pair of hand movement drive parts 1102c are attached to the pair of respective posture adjustment hands 1101. The rotation part 1102b, the pair of hand movement drive parts 1102c, and the posture adjustment part movement mechanism 1103 are each driven by a servo mechanism in accordance with a control instruction from the control part 1001.

The base part 1102a is provided freely movable back and forth in the y-axis direction by virtue of the posture adjustment part movement mechanism 1103 and moves, in the y-axis direction, the entire posture adjustment part 1100, in other words, the base part 1102a, and the rotation part 1102b, the hand movement drive parts 1102c, a support part 1102d, and the posture adjustment hands 1101, which provided above the base part 1102a.

The rotation part 1102b is provided on the base part 1102a to be freely rotatably in a horizontal plane (xy plane). The rotation part 1102b rotates, about a rotation center C thereof, the hand movement drive parts 1102c, the support part 1102d, and the posture adjustment hands 1101, which are provided above.

The pair of hand movement drive parts 1102c are supported from below by the support parts 1102d attached on the rotation part 1102b respectively, provided on one straight line passing through the rotation center C of the rotation part 1102b in a horizontal plane (xy plane), and configured to move close to and away from each other in a direction in which the one straight line extends. The pair of hand movement drive parts 1102c move close to and away from each other while the pair of posture adjustment hands 1101 are always maintained at positions symmetric with respect to the rotation center C of the rotation part 1102b. In other words, the pair of posture adjustment hands 1101 always move symmetrically with respect to the rotation center C. FIG. 10A illustrates a case in which the pair of hand movement drive parts 1102c are positioned on a straight line L1 parallel to the x axis with the rotation center C interposed therebetween. It is defined that the rotation part 1102b is positioned at an origin position when the pair of posture adjustment hands 1101 are disposed opposite to each other on the straight line L1.

The disposed positions of the conveyance pallet PT and the posture adjustment part 1100 at a time when posture adjustment is performed are determined in advance. The disposed positions of the conveyance pallet PT and the posture adjustment part 1100 in this timing are referred to as posture adjustment execution positions thereof, respectively. More specifically, the posture adjustment execution position of the conveyance pallet PT and the posture adjustment execution position of the posture adjustment part 1100 are determined so that the rotation center C of the rotation part 1102b coincides with the position of the symmetrical axis of the grommet chucks 1020 (more specifically, the pair of grasping parts 1021) in a horizontal plane. In FIG. 10B, the symmetrical axis L3 of the grommet chucks 1020 (pair of grasping parts 1021) is illustrated with a dashed and single-dotted line.

In the posture adjustment part 1100 disposed at the posture adjustment execution position, grasping of the grommet 28 by the pair of posture adjustment hands 1101 and cancellation thereof are implemented by the action that the pair of hand movement drive parts 1102c disposed at respective positions opposite to each other with respect to the grommet 28 move close to and away from each other. Since the pair of posture adjustment hands 1101 always move symmetrically with respect to the rotation center C as described above, the position of the axis center of the contact member 20 in a horizontal plane always coincides with the position of the rotation center C of the rotation part 1102b while the pair of posture adjustment hands 1101 grasp the grommet 28. In the present embodiment, the disposed position of the contact member 20 when the contact member 20 is disposed so that the position of the axis center of the contact member 20 in a horizontal plane coincides with the rotation center C of the rotation part 1102b is referred to as the posture adjustment position, in particular.

Thus, when the rotation part 1102b rotates while the pair of posture adjustment hands 1101 grasp the grommet 28 of the contact member 20, the rotation is performed around the rotation center C while the contact member 20 including the grommet 28 is maintained at the posture adjustment position.

In a state that the conveyance pallet PT and the posture adjustment part 1100 are disposed at the posture adjustment execution positions thereof, the pair of posture adjustment hands 1101 comes to grasp the grommet 28 at a position lower than the grommet chucks 1020, as illustrated in FIG. 10B. Although the posture adjustment hands 1101 grasp the grommet 28 in FIGS. 10A and 10B, this grasping state is canceled in advance at the time when the posture adjustment part 1100 retracts by moving backward to the negative y-axis direction side. In addition, the support part 1102d is provided at a position outside of the disposed position of the housing opening mechanism 1030 in the radial direction of the rotation part 1102b. This configuration prevents the pair of posture adjustment hands 1101 from interfering with the grommet 28 (contact member 20).

The image capturing part 1200 includes a camera 1201 having a vertically upward image capturing direction (in the z-axis positive direction), and a support part 1202 supporting the camera 1201 at the image capturing position.

As illustrated in FIG. 10B, the camera 1201 is disposed at a height position lower than the housing 24 positioned at the lowest end part in the vertical direction in the wiring side assembly 30 held on the conveyance pallet PT and lower than the rotation part 1102b, and captures, from the position, an image of the end part 20A of the contact member 20, which is positioned vertically above, on the insertion port 23 side. A through-hole 1102h is formed in the base part 1102a and the rotation part 1102b of the posture adjustment part 1100 at a position above the camera 1201 to enable such image capturing, and the camera 1201 captures an image of the end part 20A of the contact member 20 through the through-hole 1102h.

More specifically, at the posture adjustment station ST2, the camera 1201 is disposed so that an image capturing central position thereof in a horizontal plane (xy plane) coincides with the rotation center C of the rotation part 1102b while the posture adjustment part 1100 is disposed at the posture adjustment execution position.

Posture Adjustment of Contact Member at Posture Adjustment Station

When the conveyance pallet PT is disposed at the posture adjustment station ST2 having the above-described configuration, the posture adjustment processing of the contact member 20 by using the pair of posture adjustment hands 1101 is performed under control of the control part 1001 to adjust the contact member 20 to the insertion possible posture (step S4 in FIG. 8).

Figure 11:
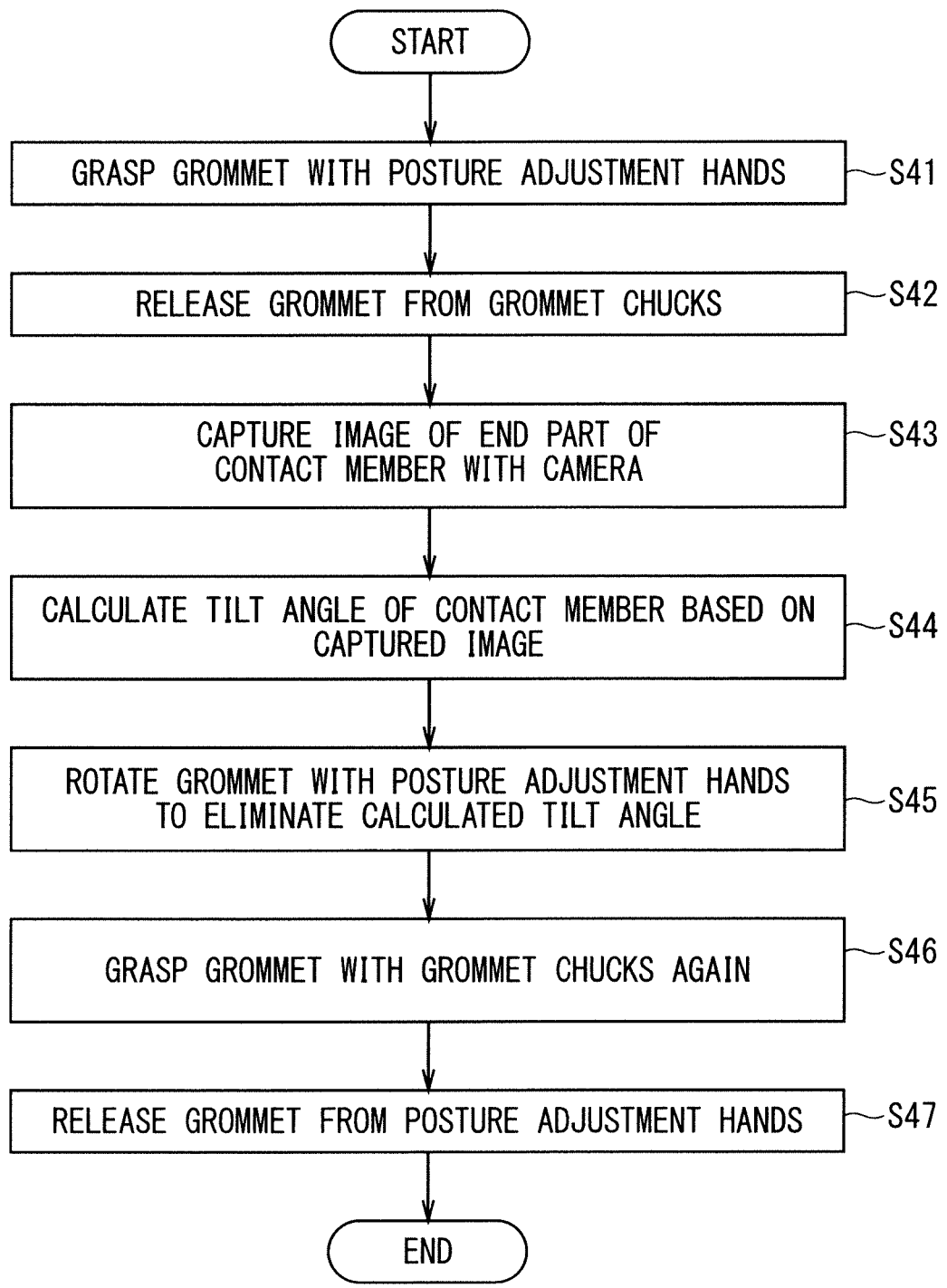
FIG. 11 is a diagram illustrating the main procedure of posture adjustment processing.
Figure 12:
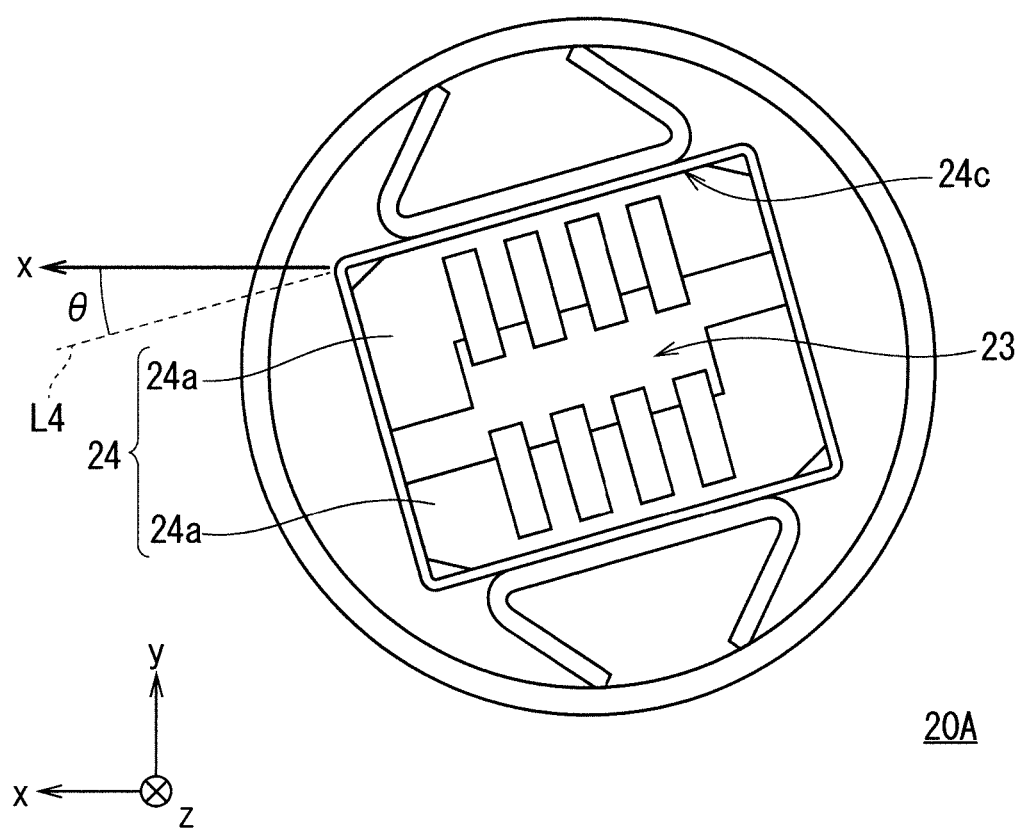
FIG. 12 is a front view of the end part 20A of the contact member 20 on the insertion port 23 side, as an example of the contact member 20 before posture adjustment.

FIG. 11 is a diagram illustrating the main procedure of the posture adjustment processing. FIG. 12 is a front view of the end part 20A of the contact member 20 on the insertion port 23 side, as an example of the contact member 20 before the posture adjustment. FIG. 12 corresponds to a captured image of the end part 20A captured by the camera 1201 at a timing before the posture adjustment. FIGS. 13A and 13B, 14A to 14C, 15A to 15C, and 16A to 16C are top views illustrating, at stages, the state of change of the posture adjustment station ST2 halfway through the posture adjustment.

Figure 13A:
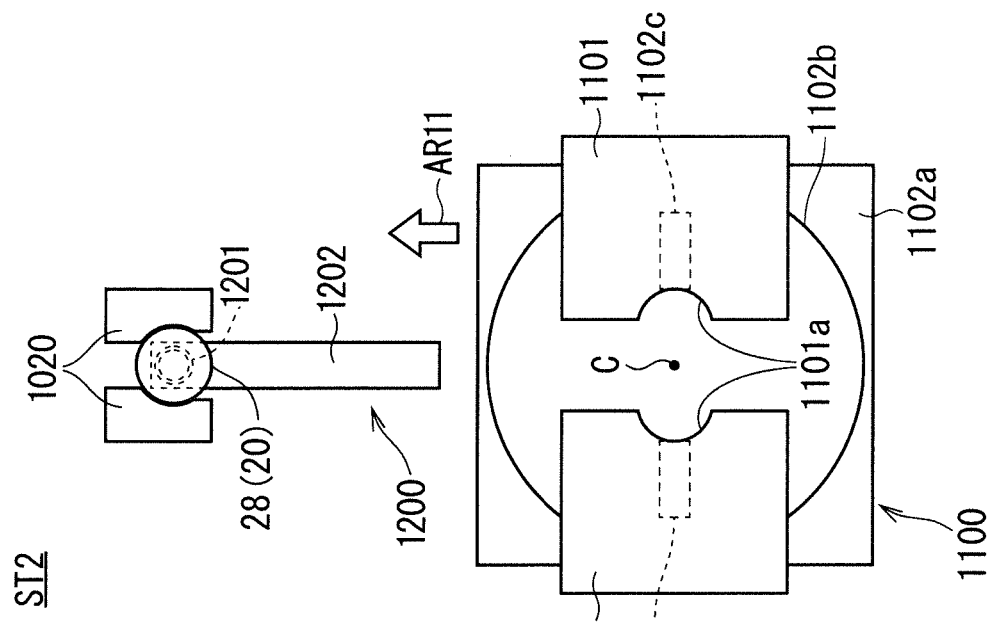
FIGS. 13A and 13B are top views illustrating, at stages, the state of change of a posture adjustment station ST2 halfway through the posture adjustment.
Figure 13B:
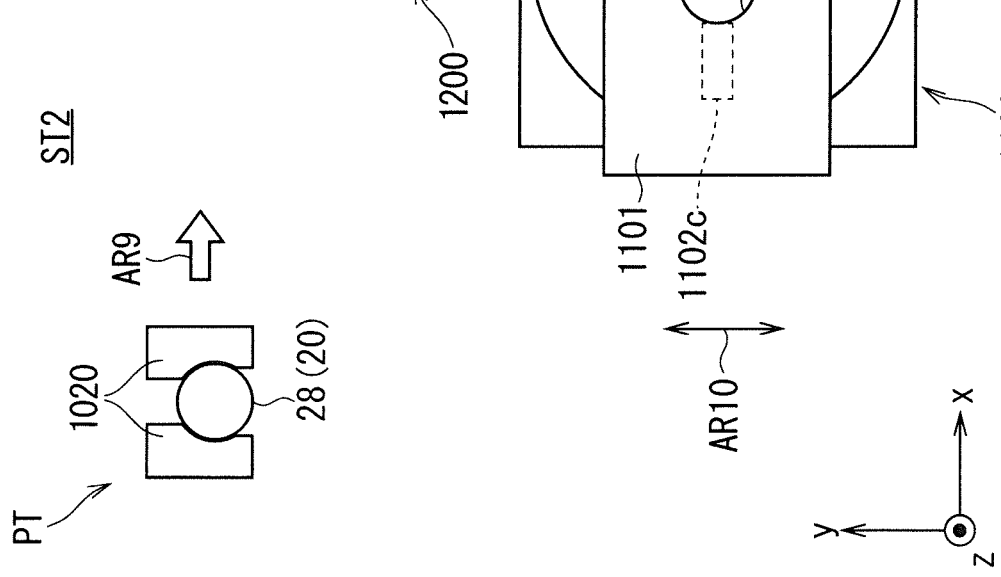

First, the conveyance pallet PT moves from the input station ST1 in the x-axis positive direction as illustrated with arrow AR9 in FIG. 13A, and is disposed at the predetermined posture adjustment execution position of the posture adjustment station ST2 as illustrated in FIG. 13B (step S3 in FIG. 8). In this case, as illustrated in FIG. 13A, the grommet 28 of the contact member 20 is grasped (chucked) by the grommet chucks 1020 (more specifically, by the grasping parts 1021 thereof). At this stage, only the camera 1201 supported by the support part 1202 is fixedly disposed below the posture adjustment execution position at the posture adjustment station ST2, and the adjustment hand drive part 1102 provided movable in the y-axis direction as illustrated with arrow AR10 is retracted at the predetermined origin position. Thus, a state in which the conveyance pallet PT is disposed at the posture adjustment execution position is, in other words, a state in which the grommet 28 of the contact member 20 is disposed above the camera 1201.

The grommet chucks 1020 are disposed at positions symmetric with respect to the grommet 28 in each of FIGS. 13A and 13B, 14A to 14C, 15A to 15C, and 16A to 16C for simplicity of illustration, but, since precise positioning is not performed when the grommet 28 is grasped by the grommet chucks 1020 at the input station ST1 as described above, thus at this stage, the grommet 28 is not necessarily grasped by the grommet chucks 1020 while such a symmetric property is satisfied. For example, the grommet 28 may be grasped by the grommet chucks 1020 with being slightly shifted to the y-axis negative direction from a position exemplarily illustrated in FIG. 13A.

After the conveyance pallet PT is disposed at the posture adjustment execution position, the posture adjustment part movement mechanism 1103 is driven so that the posture adjustment part 1100 being retracted at a predetermined retraction position moves in the y-axis positive direction as illustrated with arrow AR11 in FIG. 13B and is disposed at the posture adjustment execution position. Specifically, the posture adjustment part 1100 is disposed so that the position of the rotation center C of the rotation part 1102b in a horizontal plane coincides with the position of the symmetrical axis of the grommet chucks 1020 in a horizontal plane. FIG. 14A illustrates such a disposition state. In this state, the rotation part 1102b is positioned at the origin position, and the pair of posture adjustment hands 1101 are sufficiently separated from each other and thus do not interfere with the contact member 20 (grommet 28).

After the posture adjustment part 1100 is disposed in such a manner, the pair of hand movement drive parts 1102c are driven so that the pair of posture adjustment hands 1101 move in a direction in which the pair of posture adjustment hands 1101 become close to each other as illustrated with arrow AR12 in FIG. 14A, and grasp (chuck) the grommet 28 as illustrated in FIG. 14B (step S41).

Then, immediately after the grasping is performed, the grommet chucks 1020 move so as to separate from each other as illustrated with arrow AR13 in FIG. 14B, and release the grasped grommet 28 (step S42). Since the pair of posture adjustment hands 1101 always move symmetrically with respect to the rotation center C, the pair of posture adjustment hands 1101 grasp the grommet 28 so that the axis center line of the grommet 28 coincides with the rotation center C of the rotation part 1102b, in other words, at the posture adjustment position as illustrated in FIG. 14C, even when the grasping of the grommet 28 by the grommet chucks 1020 has been performed at a position shifted from the symmetrical axis thereof. In other words, the contact member 20 is transferred at the posture adjustment position from the grommet chucks 1020 to the posture adjustment hands 1101.

After the transfer is performed, the camera 1201 captures, through the through-hole 1102h, an image of the end part 20A of the contact member 20, which is positioned vertically above, on the insertion port 23 side (step S43). The captured image (captured image data) generated by the image capturing is immediately acquired by the control part 1001, and the tilt angle calculation part 1005 calculates a tilt angle θ of the contact member 20 in a horizontal plane (xy plane) based on the captured image (step S44).

Consider a case in which the image illustrated in FIG. 12 is an exemplary captured image of the end part 20A. In the captured image illustrated in FIG. 12, the contact member 20 is tilted anticlockwise in a horizontal plane (xy plane) as a whole. FIG. 12 illustrates xyz coordinates corresponding to that in FIG. 6 for comprehension of correspondence with the disposed position of the contact member 20 in the assembling apparatus 1000. In the present embodiment, the tilt angle θ of the contact member 20 is defined to be the angle between a direction in which an edge part 24c of the housing 24 illustrated with a dashed line L4 extends and the x-axis direction of the assembling apparatus 1000 in the captured image.

The tilt angle calculation part 1005 extracts the edge part 24c of the housing 24 by applying a well-known image processing technology on a captured image as exemplarily illustrated in FIG. 12, and calculates the tilt angle θ based on the tilt of the direction in which the edge part 24c extends.

After the tilt angle θ is calculated, the posture adjustment hands 1101 rotate the grommet 28 to eliminate the tilt at the tilt angle θ (step S45).

More specifically, the posture adjustment hands 1101 and the hand movement drive parts 1102c configured to move the posture adjustment hands 1101 in a horizontal plane are supported by the support part 1102d attached on the rotation part 1102b as described above, and the posture adjustment hands 1101 grasp the grommet 28 in a state in which the axis center line thereof coincides with the rotation center C of the rotation part 1102b, and thus the contact member 20 including the grommet 28 rotates about the rotation center C in a horizontal plane (xy plane) as the rotation part 1102b rotates from the origin position about the rotation center C. Accordingly, the tilt of the contact member 20 in a horizontal plane is eliminated, and the contact member 20 is adjusted to the insertion possible posture at the posture adjustment position.

When the end part 20A of the contact member 20 is tilted anticlockwise in the captured image from vertically below, which is illustrated in FIG. 12, the contact member 20 is tilted clockwise in a horizontal plane (xy plane) in a top view of the contact member 20 viewed vertically from above, which is illustrated in FIG. 15A. Thus, the rotation part 1102b rotates anticlockwise as indicated with arrow AR14 from the origin position by the angle θ to eliminate the tilt.

Since the contact member 20 is connected with the wire harness 22 as illustrated in FIG. 2, and besides the wire harness 22 is held on the holding part PTa of the conveyance pallet PT at the input station ST1 together with the contact member 20 as illustrated in FIG. 9, it seems that, when the contact member 20 is rotated by rotating the grommet 28, the rotation is encumbered by the wire harness 22.

However, as described above, the holding of the wire harness 22 at the harness holding part 1040 of the holding part PTa and the housing of the wire harness 22 at the harness housing part 1050 only restrict the wire harness 22 to inside of the ranges of the harness holding region 1043 and the harness house region 1053, and thus do not completely fix the wire harness 22 nor prevent movement thereof. In reality, when the grommet 28 is rotated as described above, the wire harness 22 is twisted following the rotation (receives twisting moment), but the wire harness 22 is not fixed to the outer tube 4 nor to the harness holding part 1040, and as a result, the twist is absorbed as displacement and deformation of the wire harness 22 and does not encumber rotation of the contact member 20. Since the roller 1042 is provided to the harness holding part 1040 as described above, the roller 1042 rotates along with displacement of the wire harness 22 while the wire harness 22 is in contact with the roller 1042, which smooths displacement of the wire harness 22.

FIG. 15B illustrates a state after the rotation part 1102b has rotated by the angle θ. In this state, the end part 20A of the contact member 20, which has been tilted as illustrated in FIG. 12 before the rotation, has no tilt as illustrated in FIG. 5. Accordingly, the disposition orientation of the pair of posture adjustment hands 1101, which has been aligned with the x-axis direction before the rotation, is tilted by the angle θ relative to the x axis as illustrated with a dashed and single-dotted line L5 in FIG. 15B.

After the tilt of the contact member 20 is eliminated through rotation of the rotation part 1102b in this manner, the grommet chucks 1020 approach to the grommet 28 as illustrated with arrow AR15 in FIG. 15B and grasp (chuck) the grommet 28 from sides again as illustrated in FIG. 15C(step S46).

Immediately after the grommet 28 is grasped by the grommet chucks 1020 again, the pair of hand movement drive parts 1102c are driven so that the pair of posture adjustment hands 1101 move in a direction in which the pair of posture adjustment hands 1101 become separated from each other as illustrated with arrow AR16 in FIG. 15C. Accordingly, the grommet 28 is released from the grasping (chucking) by the posture adjustment hands 1101 as illustrated in FIG. 16A (step S47). That is, the grommet 28 is grasped only by the grommet chucks 1020.

In this state, the contact member 20 is maintained at the posture adjustment position. This is because the contact member 20 grasped by the pair of posture adjustment hands 1101 is positioned at the posture adjustment position, in other words, a position where the axis center of the contact member 20 coincides with the rotation center C of the rotation part 1102b, whereas the grommet chucks 1020 is provided so that the position of the symmetrical axis thereof in a horizontal plane coincides with the rotation center C of the rotation part 1102b.

In other words, it is said that the contact member 20 is transferred from the posture adjustment hands 1101 to the grommet chucks 1020 while maintaining the position (posture adjustment position) and posture (insertion possible posture) thereof. In still other words, it is also said that the wiring side assembly 30 becomes held on the conveyance pallet PT while the contact member 20 is in the insertion possible posture with no tilt in a horizontal plane.

After the transfer is performed, the rotation part 1102b rotates anticlockwise by the angle θ about the rotation center C as illustrated with arrow AR17 in FIG. 16A. Accordingly, the disposition orientation of the pair of posture adjustment hands 1101 becomes aligned with the x-axis direction again. Subsequently, the posture adjustment part 1100 is retracted by the posture adjustment part movement mechanism 1103 as illustrated with arrow AR18 in FIG. 16B, and is returned to the origin position as illustrated in FIG. 16C.

Through the above-described procedure, the posture adjustment processing ends. In the posture adjustment processing, the grommet 28 of the contact member 20 is grasped at the posture adjustment position by the pair of posture adjustment hands 1101 as described above. Then, an image of the end part 20A of the contact member 20 is captured, and the rotation part 1102b is rotated about the rotation center C based on a result of the image capturing to eliminate the tilt of the contact member 20 so that the contact member 20 in which the grommet 28 is grasped by the pair of posture adjustment hands 1101 is adjusted to the insertion possible posture at the posture adjustment position. Accordingly, in the assembling apparatus 1000 according to the present embodiment, the contact member 20 of the wiring side assembly 30 disposed on the conveyance pallet PT by the operator is always adjusted to the insertion possible posture at an identical position (the posture adjustment position).

Securing of Opening of Insertion Port of Housing

After the contact member 20 is adjusted to the insertion possible posture through the posture adjustment processing, the opening securing processing is performed at the posture adjustment station ST2 (step 5 in FIG. 8). The opening securing processing is processing of securing the opening state of the insertion port 23 of the housing 24, and implemented through actuation of the housing opening mechanism 1030 provided to the conveyance pallet PT under control of the control part 1001.

Figure 17:
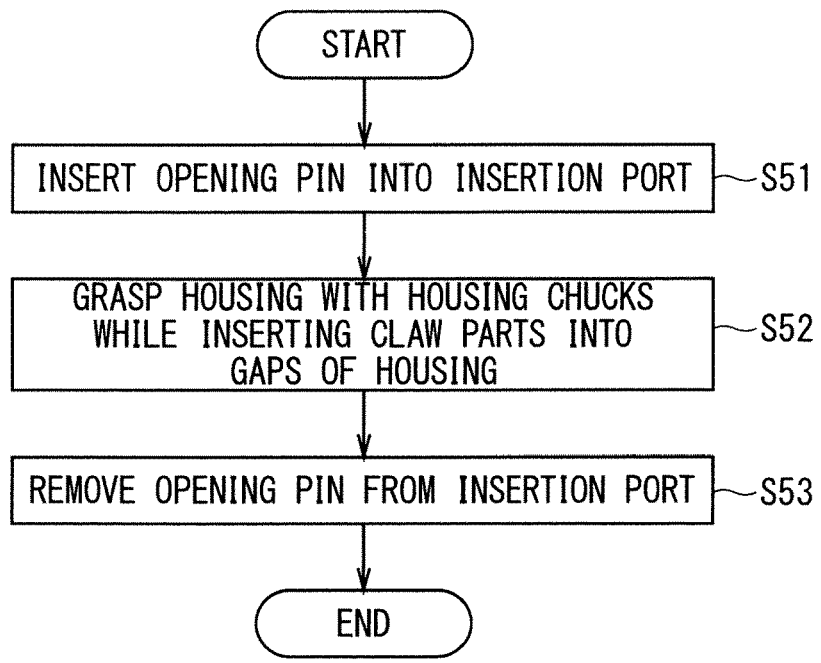
FIG. 17 is a diagram illustrating the procedure of opening securing processing.
Figure 18:
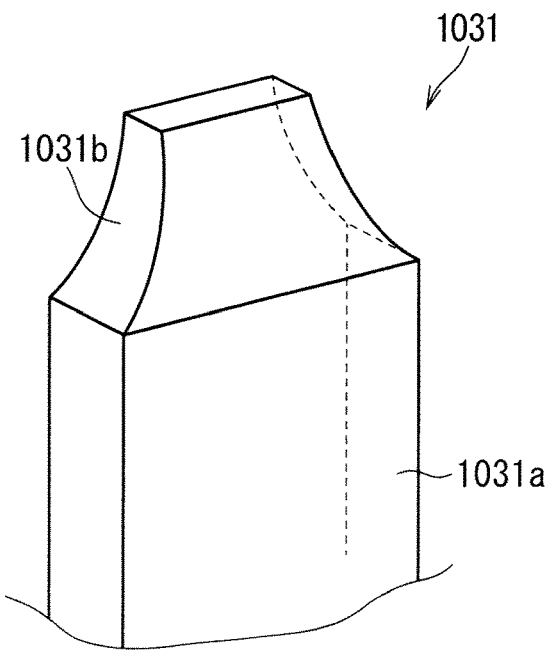
FIG. 18 is a diagram exemplarily illustrating the shape of an opening pin 1031 used in the opening securing processing at the vicinity of a leading end part thereof.

FIG. 17 is a diagram illustrating the procedure of the opening securing processing. FIG. 18 is a diagram exemplarily illustrating the shape of the opening pin 1031 used in the opening securing processing at the vicinity of a leading end part thereof. FIGS. 19A to 19C, 20A to 20C, and 21A to 21C are diagrams illustrating, at stages, states halfway through the opening securing processing. Among these diagrams, FIGS. 19A, 20A, 21A and 21C are zx plan views (front views) schematically illustrating states of the vicinity of the housing 24 on the conveyance pallet PT, and FIGS. 19B, 19C, 20B, 20C, and 21B are xy plan views (when the housing 24 is viewed from vertically below) schematically illustrating states of the main part of the end part 20A of the contact member 20.

Figure 19A:
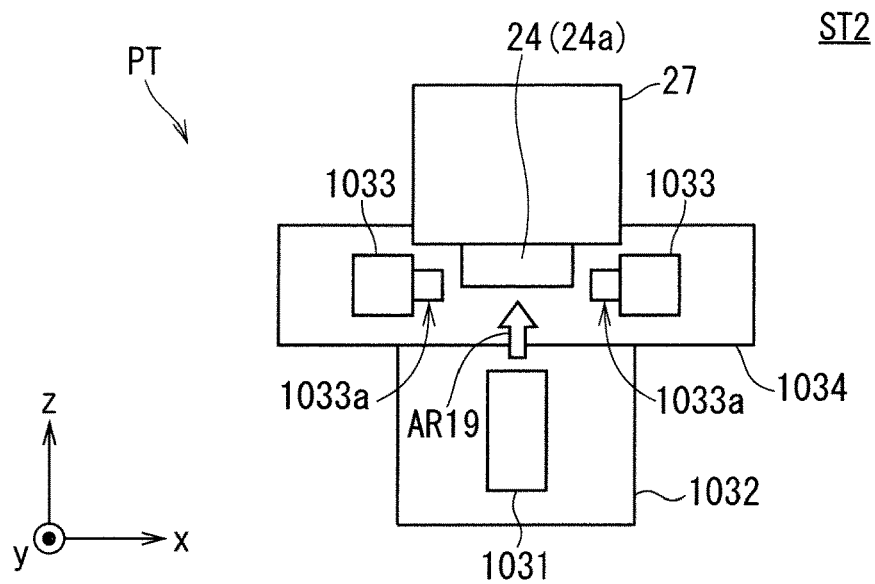
FIGS. 19A, 19B, and 19C are diagrams illustrating, at stages, a state halfway through the opening securing processing.

Before the opening securing processing starts after the posture adjustment processing has ended, the housing 24 is not grasped by the housing chucks 1033 provided to the housing opening mechanism 1030 as illustrated in FIG. 19A. Accordingly, the housing 24 is not completely fixed and may displace in the range of the metal fitting 25. Thus, the opening width of the insertion port 23 is not necessarily constant.

Figure 19B:
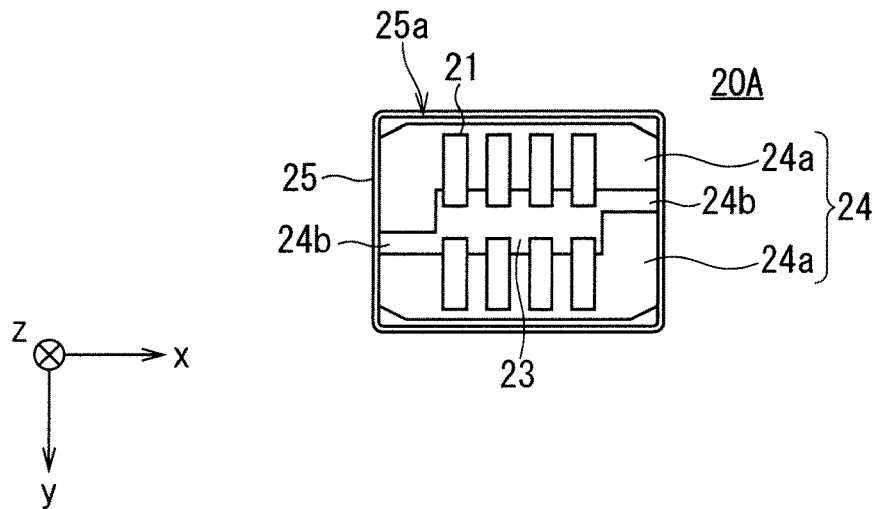

For this reason, in the contact member 20 right after the posture adjustment processing, for example, a gap 25a is formed between each housing member 24a and the metal fitting 25 as illustrated in FIG. 19B, and the opening width of the insertion port 23 is smaller than the thickness of the sensor element 1 in some cases. If, in such a state, the sensor element 1 is tried to be inserted into the insertion port 23 to integrate the gas sensor main body 10 and the contact member 20, the sensor element 1 collides with the housing members 24a or the contact-point members 21, and the insertion cannot be performed, even though the contact member 20 is adjusted to the insertion possible posture, and the collision causes cracks and chips of the sensor element 1, which is not preferable.

To prevent the occurrence of such failure, the assembling apparatus 1000 performs, in advance before insertion of the sensor element 1, the opening securing processing on the contact member 20 adjusted to the insertion possible posture.

In the opening securing processing, first, the opening pin drive part 1032 is actuated to move vertically upward the opening pin 1031 disposed below the housing 24 as illustrated with arrow AR19 in FIG. 19A and insert the opening pin 1031 into the insertion port 23 of the housing 24 (step S51).

The opening pin 1031 includes an elongated base part 1031a having a width substantially equal to and a thickness substantially equal to or slightly larger than those of the sensor element 1, and a leading end part 1031b in a tapered shape having a width and a thickness smaller than those of the base part 1031a as illustrated in FIG. 18. The opening pin 1031 is provided freely movable back and forth in the z-axis direction by the opening pin drive part 1032, and more specifically, is provided so that the axis center position thereof coincides with the position of the central axis of the contact member 20 in a horizontal plane when the contact member 20 is positioned at the posture adjustment position.

Furthermore specifically, the opening pin 1031 is freely movable back and forth in the z-axis direction in a posture in which the axis center line thereof coincides with the central axis of the contact member 20 held at the insertion possible posture on the conveyance pallet PT, and the section longitudinal direction thereof aligns with the x axis.

The leading end part 1031b enters into the insertion port 23 while being guided by the contact-point members 21 provided to the housing 24. In the housing 24, since the contact-point members 21 disposed oppositely with respect to the insertion port 23 each include the protrusion part 21d, the insertion port 23 is not completely closed at insertion of the opening pin 1031.

Figure 19C:
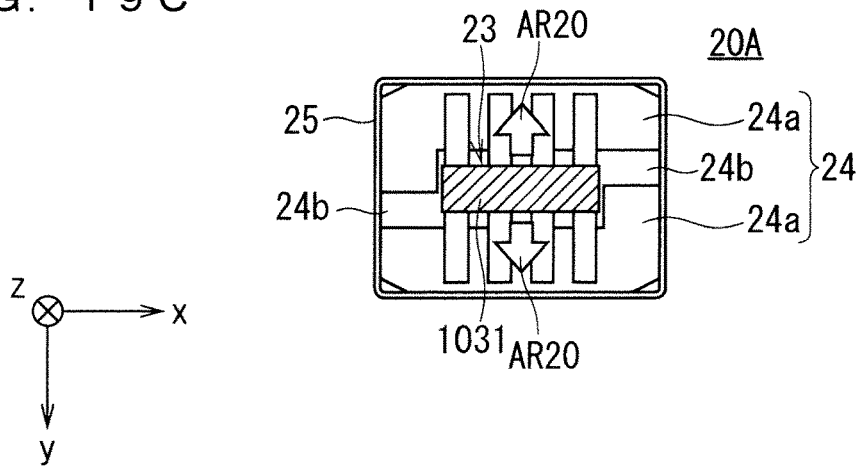

Thus, in the process of moving the opening pin 1031 vertically upward, once the leading end part 1031b enters into the insertion port 23 even when the insertion port 23 is narrowed as illustrated in FIG. 19B, the leading end part 1031b gradually expands the insertion port 23 by pressing as illustrated with arrow AR20 in FIG. 19C as the opening pin 1031 moves upward, and accordingly, the opening pin 1031 is reliably inserted. Finally, a part up to a predetermined position of the base part 1031a is inserted into the insertion port 23.

Figure 20A:
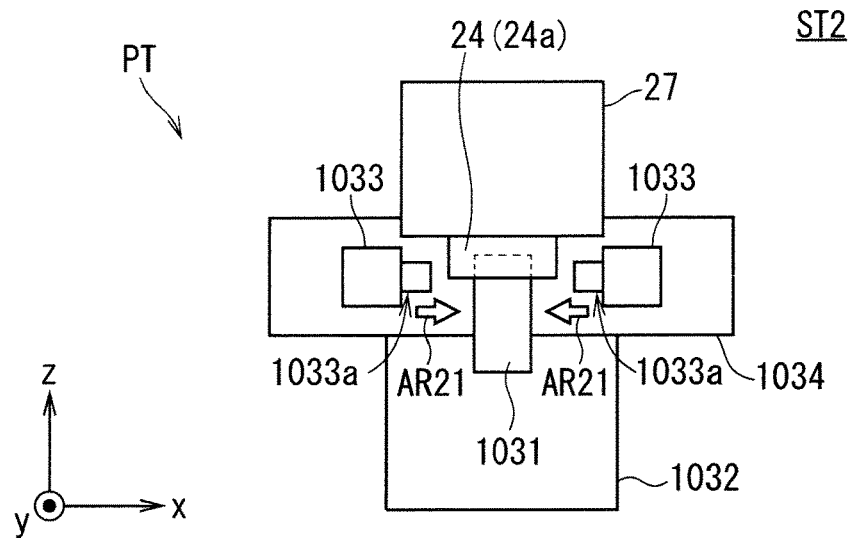
FIGS. 20A, 20B, and 20C are diagrams illustrating, at stages, a state halfway through the opening securing processing.
Figure 20B:
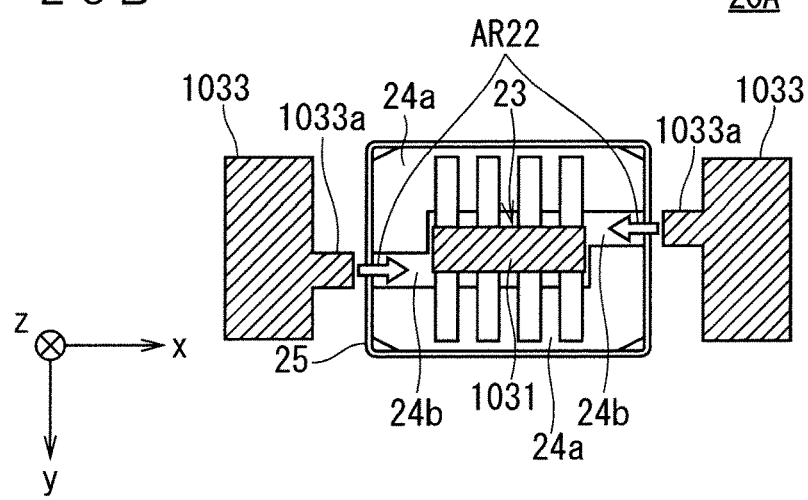
Figure 20C:
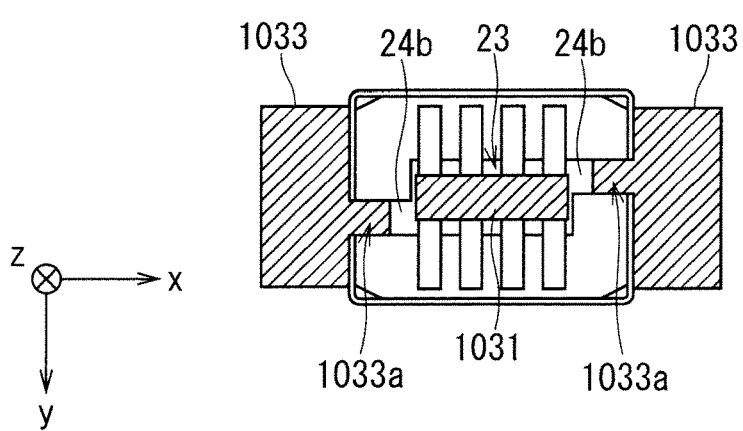
Figure 21A:
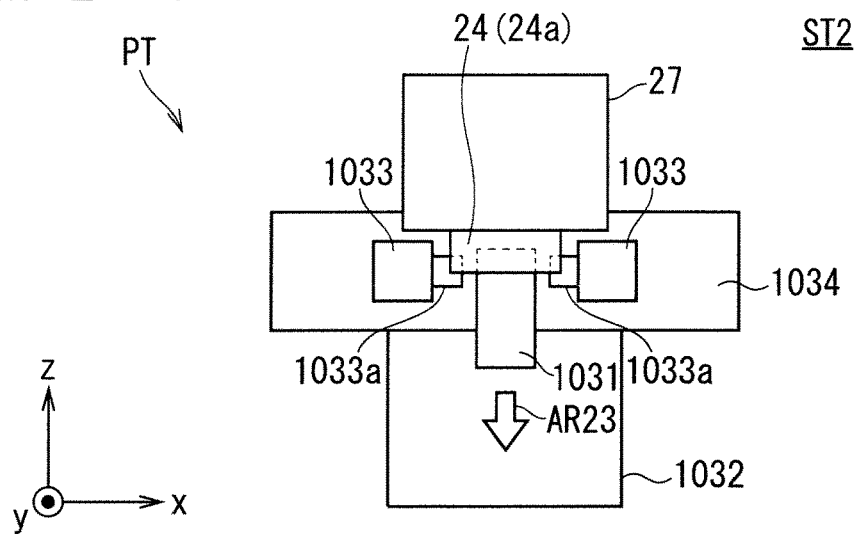
FIGS. 21A, 21B, and 21C are diagrams illustrating, at stages, a state halfway through the opening securing processing.

After the opening pin 1031 is inserted into the insertion port 23 in a manner as described above, the chuck drive part 1034 is actuated so that the pair of housing chucks 1033 move close to each other in the x-axis direction as illustrated with arrow AR21 in FIG. 20A and grasp the housing 24 (more specifically, including part of the metal fitting 25 outside thereof), with inserting the claw parts 1033a into the gaps 24b of the housing 24 as illustrated with arrow AR22 in FIG. 20B (step S52). FIGS. 20C and 21A exemplarily illustrate the insertion of the claw parts 1033a and the grasping by the pair of housing chucks 1033.

In a state in which the contact member 20 is in the insertion possible posture at the posture adjustment position and the opening pin 1031 is inserted in the insertion port 23, the gaps 24b of the housing 24 extend in the x-axis direction similarly to the insertion port 23. The claw parts 1033a of the pair of housing chucks 1033 are provided so that the disposed positions thereof in the y-axis direction coincide with the disposed positions of the gaps 24b of the housing 24 in the y-axis direction in the state. Thus, in the state, the claw parts 1033a are smoothly inserted into the gaps 24b without interference nor collision with the housing members 24a.

Figure 21B:
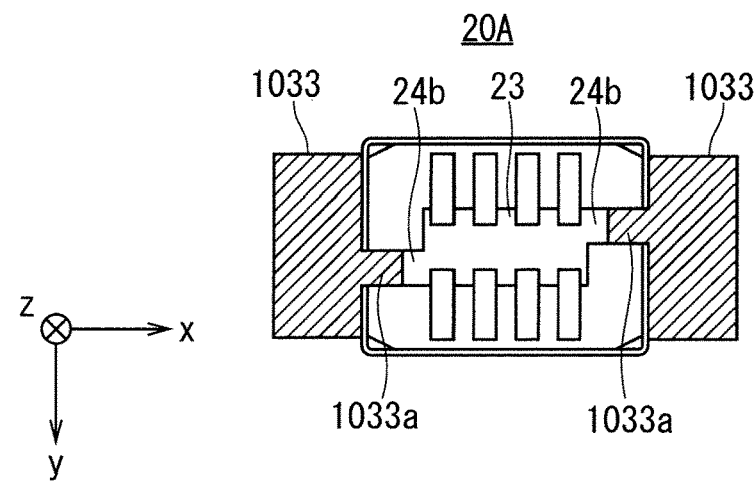

Then, after the grasping by the pair of housing chucks 1033 is performed, the opening pin drive part 1032 is actuated again to remove the opening pin 1031 from the insertion port 23 as illustrated with arrow AR23 in FIG. 21A (step S53). FIG. 21B illustrates a state after the removal of the opening pin 1031. In this state, the claw parts 1033a of the pair of housing chucks 1033 are still inserted in the gaps 24b. Since the thicknesses of the claw parts 1033a are substantially equal to the maximum values of the gaps 24b, the opening width of the insertion port 23 of the housing 24 is held substantially equal to the thickness of the sensor element 1. The opening state of the insertion port 23 of the housing 24 is maintained unless the claw parts 1033a are removed from the gaps 24b.

Through the above-described procedure, the opening securing processing ends. The insertion port 23 of the housing 24 is secured to the opening at an opening width substantially equal to the thickness of the sensor element 1 through the opening securing processing.

Since the opening securing processing is performed following the posture adjustment processing at the posture adjustment station ST2 as described above, the contact member 20 after the posture adjustment processing is not moved at the opening securing processing. Thus, the grasping of the contact member 20 by the pair of housing chucks 1033, which involves insertion of the opening pin 1031 into the contact member 20 and insertion of the claw parts 1033a into the gaps 24b at the opening securing processing, is performed on the contact member 20 disposed at the posture adjustment position in the insertion possible posture. Since operation positions of the opening pin 1031 and the housing chucks 1033 are determined in accordance with the contact member 20 disposed in such a manner, no interference nor collision occurs between the housing 24 and each of the opening pin 1031 and the claw parts 1033a of the housing chucks 1033 in the assembling apparatus 1000 according to the present embodiment, and thus the opening of the insertion port 23 is reliably obtained.

Specifically, in the assembling apparatus 1000 according to the present embodiment, the opening pin 1031 and the claw parts 1033a of the housing chucks 1033 are each prevented from interfering or colliding with the housing 24 by performing the opening securing processing on the contact member 20 in the insertion possible posture at the posture adjustment position by using the opening pin 1031 and the housing chucks 1033, the operation positions of which are determined in accordance with the posture adjustment position and the insertion possible posture, and accordingly, the reliability of the opening securing processing is increased.

Figure 21C:
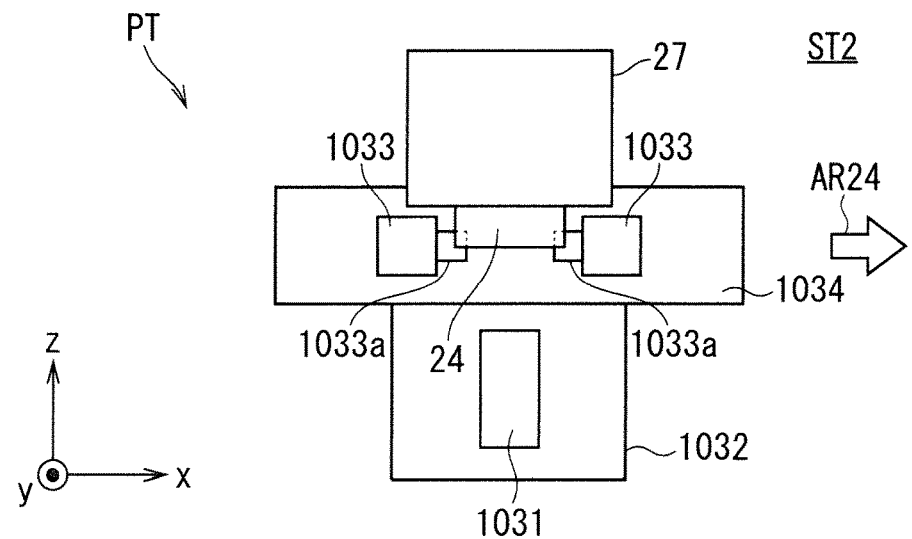

As illustrated with arrow AR24 in FIG. 21C, the conveyance pallet PT is moved in the positive x-axis direction again and disposed at the orientation check station ST3 (step S6 in FIG. 8).

Configuration of Orientation Check Station and Orientation Check of Contact Member The orientation check station ST3 is a site at which processing of checking whether the disposition orientation of the contact member 20 (in a horizontal plane) is the positive orientation or the opposite orientation is performed. In the assembling apparatus 1000 according to the present embodiment, the orientation of the contact member 20 in the insertion possible posture is checked based on the existence of conduction between the connector 29 and each of the contact-point members 21 of the contact member 20 (step S7 in FIG. 8). Then, an insertion orientation of the gas sensor main body 10 when integration is performed at the integration station ST4 to be described later is determined in accordance with a result of the check.

Figure 22:
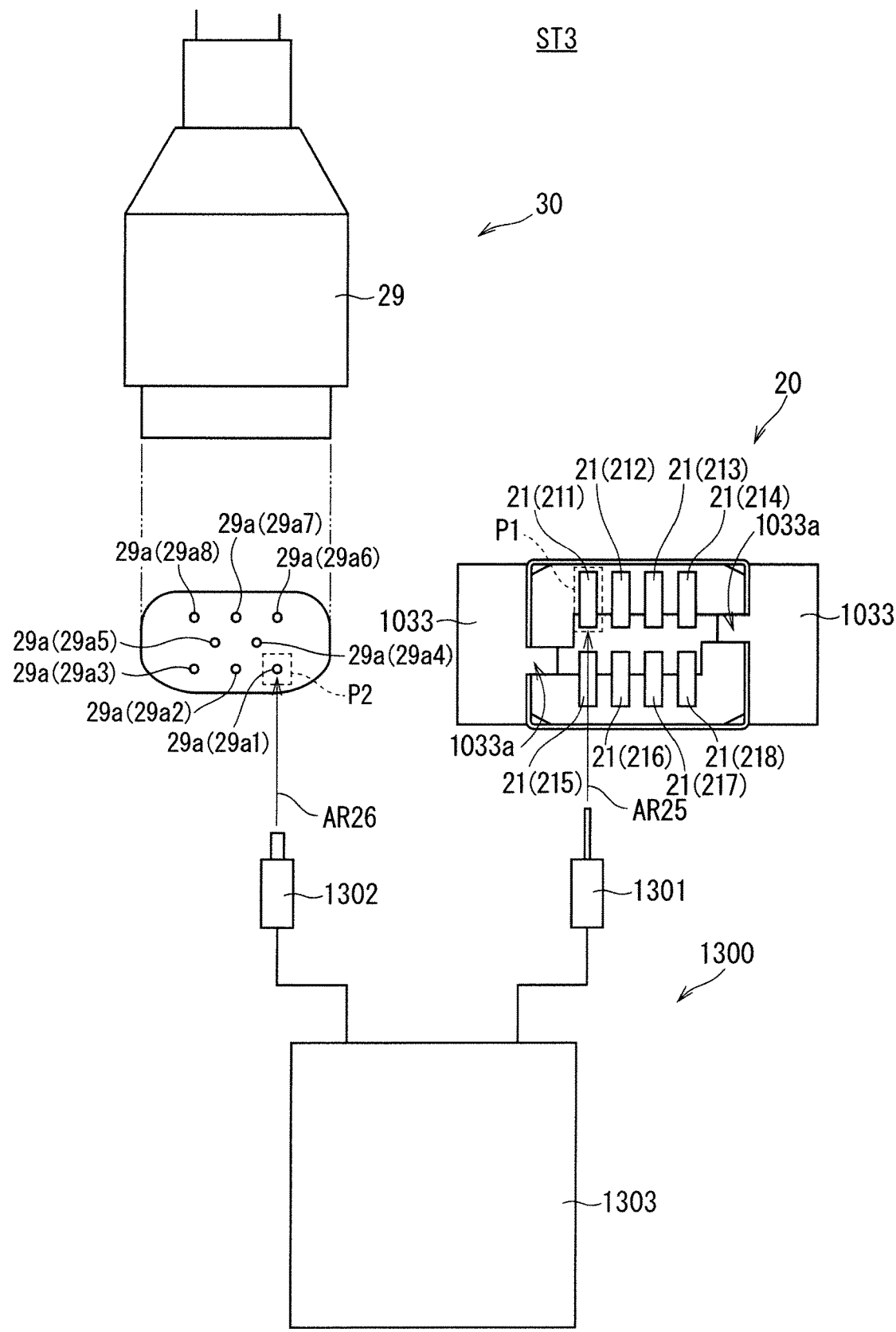
FIG. 22 is a diagram conceptually illustrating conduction check performed at an orientation check station ST3.

The orientation check station ST3 mainly includes the conduction checker 1300 configured to check conduction between each contact-point member 21 of the contact member 20 and the connector 29. FIG. 22 is a diagram conceptually illustrating conduction check performed at the orientation check station ST3. For simplification of illustration, FIG. 22 only illustrates part of the contact member 20 and the connector 29 as main part of the wiring side assembly 30 held on the conveyance pallet PT.

As illustrated in FIG. 22, the conduction checker 1300 mainly includes a first probe 1301 that contacts with the contact-point members 21 of the contact member 20 at the conduction check, a second probe 1302 that contacts (or engages) with the connector pins 29a of the connector 29, and a body part 1303 configured to measure the value of resistance between the first probe 1301 and the second probe 1302. The first probe 1301 and the second probe 1302 contact with each contact-point member 21 and each connector pin 29a, respectively, disposed at measurement points P1 and P2 fixedly determined in advance. Each output value from the body part 1303 is transferred to the control part 1001 and is used for the determination of the disposition orientation of the contact member 20 at the orientation determination part 1006.

In the wiring side assembly 30, each contact-point member 21 provided to the contact member 20 is electrically connected with the corresponding connector pin 29a of the connector 29 through the corresponding lead wire (not illustrated) housed in the wire harness 22. In the case illustrated in FIG. 22, similarly to the case illustrated in FIG. 5, it is assumed that the contact member 20 is aligned in the positive orientation, and the contact-point members 211 to 218 are connected with connector pins 29a1 to 29a8 of the connector 29, respectively.

After the conveyance pallet PT is moved from the posture adjustment station ST2 and disposed at a predetermined position in the orientation check station ST3, the first probe 1301 having been retracted at a predetermined position is moved as illustrated with arrow AR25 by a movement mechanism (not illustrated) to contact with the contact-point member 21 positioned at the measurement point P1. In the case illustrated in FIG. 22 in which the contact member 20 is disposed in the positive orientation, the contact-point member 211 is positioned at the measurement point P1, and thus the first probe 1301 contacts with the contact-point member 211.

Similarly, the second probe 1302 is moved as illustrated with arrow AR26 by a movement mechanism (not illustrated) to contact with the connector pin 29a positioned at the measurement point P2. In the case illustrated in FIG. 22, the connector pin 29a1 is positioned at the measurement point P2, and thus the second probe 1302 contacts with the connector pin 29a1.

Although not illustrated in FIG. 22, the connector 29 is held by the connector holding part 1060 at the conveyance pallet PT as illustrated in FIG. 9. More specifically, the connector 29 is supported from below by the support part 1062 provided to the connector holding part 1060. However, the support part 1062 is provided so that the second probe 1302 can access to the connector pin 29a positioned at the measurement point P2, and thus the existence of the support part 1062 does not interfere with the conduction check.

The conduction check by the conduction checker 1300 is performed by contacting both probes with the contact-point member 21 and the connector pin 29a in such manners at the measurement points P1 and P2, respectively.

As described above, the contact-point member 211 and the connector pin 29a1 are electrically connected with each other through the corresponding lead wire, and thus the output value (the value of resistance between both probes) from the body part 1303 is effectively zero when the first probe 1301 and the second probe 1302 contact with the contact-point member 211 and the connector pin 29a1, respectively, as in the case illustrated in FIG. 22.

Whereas, when the contact member 20 is disposed in the opposite orientation as a posture rotated from the positive orientation illustrated in FIG. 22 by 180°, the contact-point member 218 is disposed at the measurement point P1. In this case, instead of the contact-point member 211, the contact-point member 218 contacts with the first probe 1301 at the measurement point P1, and thus the output value from the body part 1303 is infinite (or a measurement upper limit value) even when the second probe 1302 contacts with the connector pin 29a1 similarly to the case illustrated in FIG. 22. In other words, the output value thus obtained is clearly different from an output value obtained in the case illustrated in FIG. 22.

The measurement point P2 is prepared so that the same connector pin 29a (connector pin 29a1 in the case illustrated in FIG. 22) is always disposed thereto. This is implemented by providing anisotropy to the connector 29 as described above and restricting, to an unambiguous direction, the insertion direction of the connector 29 at the insertion part 1061 of the connector holding part 1060, or by coloring the connector 29 and determining the insertion direction to the insertion part 1061 in accordance with the coloring.

The output value from the body part 1303 is provided to the orientation determination part 1006 of the control part 1001 irrespective of the magnitude of the value. The orientation determination part 1006 determines the contact member 20 to be in the positive orientation when the output value is a value that is effectively zero (equal to or smaller than a predetermined threshold close to zero), or determines the contact member 20 to be in the opposite orientation when the output value is larger than the value that is effectively zero, and then outputs a determination signal in accordance with each determination. The determination signal is used in acquisition of the gas sensor main body 10 by the main body conveyance mechanism 1400 to be described later. After the conduction check ends, the first probe 1301 and the second probe 1302 are immediately retracted to predetermined retraction positions.

After the check of the disposition orientation of the contact member 20 in the above-described manner ends, the conveyance pallet PT is moved in the positive x-axis direction again and disposed at the integration station ST4 (step S8 in FIG. 8).

Configuration of Integration Station and Integration of Gas Sensor

At the integration station ST4, processing (integration processing) of integrating the gas sensor main body 10 to the contact member 20 of the wiring side assembly 30 having been conveyed on the conveyance pallet PT is performed (step S9 in FIG. 8). FIG. 23 is a diagram illustrating a specific procedure of the integration processing performed at the integration station ST4. FIGS. 24A and 24B are main part side views illustrating a state halfway through the integration processing. For simplification of illustration, FIGS. 24A and 24B only illustrate the grommet chucks 1020 and the grasping parts 1021 thereof as components of the conveyance pallet PT.

Schematically, the integration processing is performed by moving the gas sensor main body 10 upward from below to insert the sensor element 1 provided to the gas sensor main body 10 into the insertion port 23 formed in the housing 24 provided to the contact member 20 and facing vertically downward at the conveyance pallet PT, and then by swaging the swaging ring 27 from outside to reduce the diameter thereof.

Although not illustrated, at the conveyance pallet PT disposed in the integration station ST4, the contact member 20 maintains the insertion possible posture, and the opening of the insertion port 23 of the housing 24 is secured by the housing chucks 1033.

The integration processing according to the present embodiment is performed with the main body assembly mechanism 1070 provided to the conveyance pallet PT and the main body conveyance mechanism 1400 and the swage processing part 1500 provided to the integration station ST4.

As illustrated in FIG. 9, the main body assembly mechanism 1070 is provided below the housing opening mechanism 1030 at the holding part PTa of the conveyance pallet PT. The main body assembly mechanism 1070 includes main body holding chucks 1071 configured to grasp the gas sensor main body 10, a chuck drive part 1072 configured to drive the main body holding chucks 1071, and a chuck elevation mechanism 1073 configured to move the main body holding chucks 1071 and the chuck drive part 1072 along a guide 1073g upward and downward in the vertical direction. The chuck elevation mechanism 1073 is, for example, an air cylinder.

The chuck drive part 1072 and the chuck elevation mechanism 1073 are each driven in accordance with a control instruction from the control part 1001. The main body assembly mechanism 1070 is configured so that, through such driving while the conveyance pallet PT is disposed at the integration station ST4, the main body holding chucks 1071 grasp the gas sensor main body 10 and move the gas sensor main body 10 in the vertical direction while maintaining this grasping state.

The swage processing part 1500 includes a swaging jig 1501 configured to swage the swaging ring 27, and a swaging jig drive mechanism 1502 configured to drive the swaging jig 1501. Driven by the swaging jig drive mechanism 1502 in a state that the sensor element 1 of the gas sensor main body 10 is inserted in the insertion port 23 of the contact member 20, the swaging jig 1501 contacts with the swaging ring 27 from outside and further presses the swaging ring 27 to reduce the diameter of the swaging ring 27.

The integration processing is started at a time when the conveyance pallet PT holding the wiring side assembly 30 including the contact member 20 moves to the integration station ST4, and the contact member 20 is disposed at a disposed position (integration position) determined in advance as described above. First, the main body conveyance mechanism 1400 acquires the gas sensor main body 10 prepared in an orientation determined in advance at the main body waiting area W2 (step S91).

Having acquired the gas sensor main body 10, the main body conveyance mechanism 1400 then transfers the gas sensor main body 10 to the main body holding chucks 1071 disposed below the contact member 20 (step S92). Specifically, after the chuck elevation mechanism 1073 disposes the main body holding chucks 1071 and the chuck drive part 1072 at a transfer position sufficiently vertically lower than the disposed position of the contact member 20 (at which the gas sensor main body 10 does not interfere with the contact member 20), the gas sensor main body 10 conveyed to the transfer position by the main body conveyance mechanism 1400 is grasped by the main body holding chucks 1071 driven by the chuck drive part 1072. FIG. 24A illustrates a state after this transfer is performed. The gas sensor main body 10 is grasped by the main body holding chucks 1071 in a posture in which the sensor element 1 points vertically upward and in a manner in which the axis center position of the sensor element 1 coincides with the insertion port 23 of the axis center position of the contact member 20.

More specifically, the orientation of the gas sensor main body 10 when prepared at the main body waiting area W2 is constant, but the orientation of the gas sensor main body 10 when transferred to the main body holding chucks 1071 by the main body conveyance mechanism 1400 is differentiated by 180° in accordance with a result of the above-described orientation determination at the orientation determination part 1006, in other words, depending on whether the disposition orientation of the contact member 20 in a horizontal plane is the positive orientation or the opposite orientation.

Thus, in the assembling apparatus 1000 according to the present embodiment, the gas sensor main body 10 and the contact member 20 are integrated with each other always in a combination of correct orientations without attention on the disposition orientation of the contact member 20 when the wiring side assembly 30 is disposed and held on the conveyance pallet PT by the operator.

After the gas sensor main body 10 is transferred to the main body holding chucks 1071 below the contact member 20 in an orientation in accordance with the disposition orientation of the contact member 20 in this manner, the main body holding chucks 1071 grasping the gas sensor main body 10 is moved vertically upward as illustrated with arrow AR27 in FIG. 24A through drive of the chuck elevation mechanism 1073 by the control part 1001. Accordingly, as illustrated with arrow AR28, the sensor element 1 approaches to the insertion port 23 of the housing 24 and is inserted into the insertion port 23 (step S93). FIG. 24B illustrates a state after the insertion. The insertion of the sensor element 1 is performed until each electrode terminal 1a of the sensor element 1 contacts with the protrusion part 21d of the corresponding contact-point member 21 provided to the housing 24 on a side closer to the second hooking part 21c.

After the insertion is performed, the chuck drive part 1034 is driven in accordance with a control instruction from the control part 1001 so that the claw parts 1033a are inserted into the gaps 24b of the housing 24 and the housing chucks 1033 grasping the housing 24 are moved in a direction in which the housing chucks 1033 become separated from each other. Accordingly, the claw parts 1033a are removed from the gaps 24b, and the housing 24 is released from the grasping by the housing chucks 1033 (step S94).

After the housing 24 is released by the housing chucks 1033, the swaging jig drive mechanism 1502 controlled by the control part 1001 disposes the swaging jig 1501 on a side of the swaging ring 27, and then brings the swaging jig 1501 into contact with the swaging ring 27 from the outer periphery side and further makes the swaging jig 1501 press the swaging ring 27, thereby swaging the swaging ring 27 (step S95).

Specifically, the diameter of the swaging ring 27 is reduced through the pressing from the outer periphery side by the swaging jig 1501, so that the pair of housing members 24a included in the housing 24 are biased by the pair of pressing springs 26 (refer to FIG. 5) disposed inside of the swaging ring 27 in a direction in which the housing members 24a become closer to each other, and accordingly, the sensor element 1 is sandwiched and fixed by the pair of housing members 24a. More specifically, the sensor element 1 is biased in two directions opposite to each other by the protrusion parts 21d of the contact-point members 21 provided to the respective housing members 24a. Having swaged the swaging ring 27, the swaging jig 1501 is immediately retracted to a retraction position.

Although FIG. 24B exemplarily illustrates the configuration in which the assembling apparatus 1000 is provided with the pair of swaging jigs 1501, the provision of the swaging jig 1501 in the assembling apparatus 1000 is not limited thereto, but the single swaging jig 1501 may be provided or three or more swaging jigs 1501 may be provided.

With swaging of the swaging ring 27 and sandwitching and fixing of the sensor element 1 in a manner as described above, the integration of the gas sensor main body 10 and the contact member 20 is completed.

After the integration is performed, the main body holding chucks 1071 release the gas sensor main body 10 being held and then are retracted to a transfer position by the chuck elevation mechanism 1073 (step S96). This ends the integration processing at the integration station ST4.

In this state, the conveyance pallet PT holds the wiring side assembly 30 in which the contact member 20 is integrated with the gas sensor main body 10, in other words, the uncovered product 100a as the gas sensor 100 in which the covering by the outer tube 4 is yet to be performed. The operator of the assembling apparatus 1000 removes the uncovered product 100a from the conveyance pallet PT, and places the uncovered product 100a on the uncovered product waiting area W3. Specifically, the holding or housing of each of the grommet 28, the outer tube 4, the wire harness 22, and the connector 29 by the grommet chucks 1020, the outer tube holding part 1010, the harness holding part 1040, the harness housing part 1050, and the connector holding part 1060 is canceled.

The uncovered product 100a being placed at the uncovered product waiting area W3 is provided to later processing at an appropriate timing. The conveyance pallet PT from which the uncovered product 100a has been removed is returned to the input station ST1 so as to be used for new assembly processing.

Reliability and Efficiency of Assembly Processing Based on Configuration and Operation of Assembling Apparatus Lastly, the reliability and efficiency of the assembly processing achieved as a result that the assembling apparatus 1000 according to the present embodiment employs the above-described configuration and operation are described below with summarization of operation contents of the assembling apparatus 1000.

As described above, in the assembling apparatus 1000 according to the present embodiment, the input station ST1, the posture adjustment station ST2, the orientation check station ST3, and the integration station ST4 are continuously provided in the stated order in the x-axis direction, and the conveyance direction of the conveyance pallet PT configured to hold the wiring side assembly 30 and move between the stations is aligned with the x-axis direction. Thus, an operation to move the wiring side assembly 30 by the conveyance pallet PT is simplified to a uniaxial operation only in the x-axis direction in which the stations are continuously provided.

The contact member 20 as a site of the wiring side assembly 30, which is to be integrated with the gas sensor main body 10, is only grasped from sides (in the x-axis direction) by the grommet chucks 1020 and the housing chucks 1033 on the conveyance pallet PT. The grommet chucks 1020 or the housing chucks 1033 only perform an operation to grasp the grommet 28 or the housing 24 and an operation to release the grommet 28 or the housing 24 being grasped (opening and closing operations). In the assembling apparatus 1000, a mechanism configured to hold the contact member 20 on the conveyance pallet PT does not adjust the posture of the contact member 20 nor move the contact member 20. Thus, in the assembling apparatus 1000, the mechanism configured to hold the contact member 20 on the conveyance pallet PT is simplified.

Such simplification of the operation to move the conveyance pallet PT and simplification of the holding mechanism contribute to improvement of the operation accuracy of the conveyance pallet PT, and thus contribute to improvement of the reliability of operation of the assembling apparatus 1000 and the reliability of the assembly processing.

In the assembling apparatus 1000, in the case that the posture of the contact member 20 being held on the conveyance pallet PT is tilted in a horizontal plane, the posture adjustment processing of eliminating the tilt angle θ to adjust the contact member 20 to the insertion possible posture (posture in which the insertion port 23 of the housing 24 extends in the x-axis direction) is performed by rotating the contact member 20 with the posture adjustment position as the center of rotation to eliminate the tilt angle θ, with the contact member 20 being grasped by the pair of posture adjustment hands 1101 in advance so that the contact member 20 is disposed at the posture adjustment position determined. Then, the contact member 20 after adjusted to the insertion possible posture is held on the conveyance pallet PT while being maintained in the insertion possible posture, owing to that the grommet 28 of the contact member 20 is grasped by the grommet chucks 1020 again at the posture adjustment position.

Thus, in the case that the assembling apparatus 1000 is used in the process of mass production of the gas sensor 100, the contact members 20 sequentially introduced as an assembly target are all reliably adjusted to the identical insertion possible posture (posture in which the insertion port 23 of the housing 24 extends in the x-axis direction) at the identical posture adjustment position, and held on the conveyance pallet PT again. Thus, each time the wiring side assembly 30 is disposed and held on the conveyance pallet PT by the operator of the assembling apparatus 1000, the contact member 20 is adjusted to the identical insertion possible posture at the identical position before integration with the gas sensor main body 10 and transferred to the conveyance pallet PT without precise adjustment of the posture of the contact member 20. This contributes to improvement of processing reliability and efficiency of the assembling apparatus 1000. Since the posture adjustment is performed in such a manner, a mechanism configured to adjust the posture of the contact member 20 is naturally unnecessary on the conveyance pallet PT as described above.

In addition, the contact member 20 adjusted to the insertion possible posture and held on the conveyance pallet PT again is immediately, in other words, just as it is in the insertion possible posture at the posture adjustment position at which the contact member 20 is disposed, provided to the opening securing processing of securing the opening state of the insertion port 23.

The opening securing processing is schematically processing of inserting the opening pin 1031 into the insertion port 23 from vertically below, then inserting the claw parts 1033a into the gaps 24b and grasping the housing 24 with the pair of housing chucks 1033, and thereafter removing the opening pin 1031, thereby securing the opening state of the insertion port 23 by using the claw parts 1033a.

The contact member 20 after the posture adjustment processing is provided to the opening securing processing at the posture adjustment position at which the contact member 20 is currently disposed while maintained in the insertion possible posture, and in the assembling apparatus 1000 according to the present embodiment, the operation positions of the opening pin 1031 and the pair of housing chucks 1033 including the claw parts 1033a on the conveyance pallet PT are determined in advance in accordance with the posture adjustment position and the insertion possible posture.

Thus, failure of appropriately securing the opening state of the insertion port 23 because the opening pin 1031 and the claw parts 1033a interfere or collide with the housing 24 and are not inserted into correct positions, which is caused by translation difference between the disposed position of the contact member 20 and each of the disposed positions of the opening pin 1031 and the claw parts 1033a of the housing chucks 1033 and the tilt of the contact member 20 from a correct posture, does not occur in the assembling apparatus 1000, and accordingly, insertion of the opening pin 1031 into the insertion port 23 and insertion of the claw parts 1033a into the gaps 24b when the housing 24 is grasped by the pair of housing chucks 1033 are reliably achieved in the opening securing processing. Thus, operation rate decrease attributable to such failure does not occur in the case that the assembling apparatus 1000 is used in the process of mass production. This indicates that the posture adjustment processing and the opening securing processing performed at the assembling apparatus 1000 according to the present embodiment contribute to improvement of the reliability and efficiency of the gas sensor assembly processing.

In the present embodiment, the insertion possible posture of the contact member 20, which is implemented by the posture adjustment processing, is ideally the posture of the contact member 20 in a state that the tilt angle θ of the contact member 20 having been existed in a horizontal plane is completely eliminated and the insertion port 23 extends in the x-axis direction. However, when the assembling apparatus 1000 is actually operated, the insertion port 23 is not completely aligned with the x-axis direction in some cases due to error occurring to calculation of the tilt angle θ based on an image captured by the camera 1201 and slight positional shift when the contact member 20 adjusted to the insertion possible posture is transferred from the posture adjustment hands 1101 to the grommet chucks 1020.

However, the inventor of the present invention has checked that, in the assembling apparatus 1000 according to the present embodiment, the tilt angle of the contact member 20 right after the posture adjustment hands 1101 are rotated through the posture adjustment processing is 0.03 ([deg.]) approximately at maximum, which is extremely small, and 0.37 ([deg.]) approximately at maximum in a state in which the contact member 20 is thereafter transferred to the grommet chucks 1020. Thus, it is determined that the ideal insertion possible posture is achieved in effect in the assembling apparatus 1000.

In relation to this point, the inventor of the present invention has known in advance that the opening securing processing and the integration processing are reliably performed when the tilt angle of the contact member 20 in a horizontal plane is equal to or smaller than 3 ([deg.]), but the value of 0.37 ([deg.]) is sufficiently small as compared to this value. This also indicates the high reliability of the assembly processing in the assembling apparatus 1000 according to the present embodiment.

In addition, in the assembling apparatus 1000 according to the present embodiment, the integration of the gas sensor main body 10 and the contact member 20 is performed while the contact member 20 is disposed at the integration position determined in advance at the integration station ST4. In this case, movement of the conveyance pallet PT from the posture adjustment station ST2 to the integration station ST4 is a uniaxial operation (that is, translation operation) in the x-axis direction as described above, and during the movement, the opening state of the insertion port 23 is maintained by the housing chucks 1033 provided to the conveyance pallet PT. Thus, the contact member 20 is provided to the integration processing at the integration station ST4 while the insertion possible posture and opening secure state thereof is excellently maintained.

The integration processing is schematically implemented by moving the gas sensor main body 10 upward from below the contact member 20 to insert the sensor element 1 provided to the gas sensor main body 10 into the insertion port 23 facing vertically downward, and thereafter swaging the swaging ring 27. In this case, the integration position at which the contact member 20 is disposed is determined in advance, and the posture of the contact member 20 remains in the insertion possible posture. Thus, in the case that the disposed position and posture of the sensor element 1 at the insertion are determined in advance in accordance with the disposed position and posture of the contact member 20, the insertion of the sensor element 1 into the insertion port 23 can be reliably performed for all contact members 20 when the assembling apparatus 1000 is used in the process of mass production of the gas sensor 100. As a result, the gas sensor main body 10 and the contact member 20 can be reliably integrated.

Also from the viewpoint of the integration processing, the posture adjustment processing and the opening securing processing performed at the assembling apparatus 1000 according to the present embodiment contribute to improvement of the reliability and efficiency of the gas sensor assembly processing.

In addition, in the assembling apparatus 1000 according to the present embodiment, halfway through movement of the conveyance pallet PT from the posture adjustment station ST2 to the integration station ST4, the conveyance pallet PT is temporarily disposed at the orientation check station ST3, and whether the disposition orientation of the contact member 20 in the insertion possible posture on the conveyance pallet PT is the positive orientation or the opposite orientation is specified in accordance with a result of the conduction check at the orientation check station ST3. Then, when the gas sensor main body 10 to be integrated with the contact member 20 is acquired at the integration station ST4, the gas sensor main body 10 is acquired in an orientation in accordance with the disposition orientation of the contact member 20, disposed below the contact member 20, and integrated with the contact member 20 by inserting the sensor element 1 into the insertion port 23.

Accordingly, in the assembling apparatus 1000 according to the present embodiment, without attention on the disposition orientation of the contact member 20 at a time when the wiring side assembly 30 is disposed and held on the conveyance pallet PT at the input station ST1 by the operator, the sensor element 1 is adjusted to an appropriate orientation and the gas sensor main body 10 is integrated with the contact member 20. Thus, in the assembling apparatus 1000, the sensor element 1 is not inserted into the insertion port 23 in an orientation different from a correct orientation. This contributes to the processing reliability and efficiency of the assembling apparatus 1000.

Modifications

In the above-described embodiment, the sensor element 1 has a configuration in which the four electrode terminals 1a are provided on each of the front and back surfaces, and the disposition and number of the contact-point members 21 in the housing 24 and the number of the connector pins 29a in the connector 29 are determined in accordance with this configuration. However, this is merely exemplary, and the disposition and number of the electrode terminals 1a may be determined as appropriate in accordance with the configuration of the sensor element 1, and in such a case, the disposition and number of the contact-point members 21 in the housing 24 and the number of the connector pins 29a in the connector 29 may be determined in accordance with the electrode terminals 1a.

The shapes of the posture adjustment hands 1101 and the main body holding chucks 1071 in the above-described embodiment are merely exemplary. The posture adjustment hands 1101 may have a shape different from that in the above-described embodiment as long as the contact member 20 can be rotated about the rotation center C while being maintained at the posture adjustment position, and the main body holding chucks 1071 may have a shape different from that in the above-described embodiment as long as the gas sensor main body 10 can be acquired from the main body conveyance mechanism 1400 in an appropriate orientation in accordance with a result of the determination by the orientation determination part 1006 and disposed below the contact member 20. In such a case, the configurations and disposition of the adjustment hand drive part 1102 and the chuck drive part 1072 may be determined as appropriate.

The invention claimed is:

1. A gas sensor assembling apparatus configured to integrate a first gas sensor component having an insertion port and a second gas sensor component including a sensor element by inserting a part of said sensor element protruding from said second gas sensor component into said insertion port, the gas sensor assembling apparatus comprising:
a conveyance mechanism configured to convey said first gas sensor component;
a posture adjustment station including a posture adjustment part configured to adjust the posture of said first gas sensor component in a horizontal plane; and
an integration station configured to integrate said first gas sensor component and said second gas sensor component,
wherein
said conveyance mechanism and said posture adjustment part are capable of transferring said first gas sensor component to each other,
said posture adjustment part includes a rotation mechanism configured to adjust the posture of said first gas sensor component by rotating said first gas sensor component in a horizontal plane to an insertion possible posture, eliminating a tilt angle of the first gas sensor component, determined in advance with holding said first gas sensor component having been transferred from said conveyance mechanism at a posture adjustment position fixedly determined in advance, and transfers said first gas sensor component after adjustment to said insertion possible posture to said conveyance mechanism while maintaining said first gas sensor component at said posture adjustment position,
said conveyance mechanism conveys said first gas sensor component after adjustment to said insertion possible posture to an integration position determined in advance at said integration station while maintaining said insertion possible posture, and
at said integration position, said first gas sensor component and said second gas sensor component are integrated by inserting said sensor element of said second gas sensor component into said insertion port of said first gas sensor component after adjustment to said insertion possible posture.

2. The gas sensor assembling apparatus according to claim 1, wherein said conveyance mechanism includes an opening securing element configured to secure an opening of said insertion port provided to said first gas sensor component, said opening securing element secures said opening of said insertion port on said first gas sensor component after adjustment to said insertion possible posture, with holding said first gas sensor component at said posture adjustment position, said first gas sensor component is conveyed to said integration position by said conveyance mechanism securing the opening of said insertion port by said opening securing element, and at said integration position, said sensor element is inserted into said insertion port at which the opening is secured.

3. The gas sensor assembling apparatus according to claim 2, wherein said first gas sensor component includes a housing constituted by a pair of housing members having an identical sectional shape and disposed opposite to each other, and has a configuration in which said housing is restricted from outside by a predetermined restriction member, said insertion port is a space formed between said pair of housing members in said housing and having a rectangular sectional shape, said opening securing element includes a pair of claw parts, and said opening securing element keeps said insertion port in an opening state by inserting said pair of claw parts into two gaps formed between said pair of housing members at an end part of said housing member when said first gas sensor component is in said insertion possible posture at said posture adjustment position.

4. The gas sensor assembling apparatus according to claim 3, wherein, a first direction is defined as a direction in which said insertion port extends in a horizontal plane when said first gas sensor component is in said insertion possible posture at said posture adjustment position, in said conveyance mechanism, said pair of claw parts are each provided movable back and forth in said first direction, and in said opening securing element, said pair of claw parts are moved along said first direction to be inserted into said two gaps, thereby to secure said opening of said insertion port.

5. The gas sensor assembling apparatus according to claim 4, wherein in said conveyance mechanism, said pair of claw parts are attached to a pair of housing chucks configured to grasp said housing in said first direction, and in said opening securing element, said pair of claw parts are inserted into said two gaps while said housing is grasped by said pair of housing chucks, thereby to secure said opening of said insertion port.

6. The gas sensor assembling apparatus according to claim 3, wherein said opening securing element further includes an opening pin provided movable back and forth relative to said insertion port of said first gas sensor component in said insertion possible posture, in said opening securing element, said pair of claw parts are inserted into said two gaps after said opening pin is inserted into said insertion port, and said opening pin is removed from said insertion port after said pair of claw parts are inserted into said two gaps, and said conveyance mechanism conveys said first gas sensor component to said integration station after said opening pin is removed from said insertion port.

7. The gas sensor assembling apparatus according to claim 1, wherein a position of a rotation center of said rotation mechanism is defined as said posture adjustment position, and said first gas sensor component is held at said posture adjustment position, so that said first gas sensor component is adjusted to said insertion possible posture at said posture adjustment position.

8. The gas sensor assembling apparatus according to claim 7, wherein said rotation mechanism includes a pair of grasping elements configured to rotate about said rotation center while grasping said first gas sensor component so that an axis center position of said first gas sensor component coincides with the position of said rotation center as said posture adjustment position, and in said posture adjustment part, said first gas sensor component is transferred to said conveyance mechanism by said pair of grasping elements.

9. The gas sensor assembling apparatus according to claim 7, wherein said posture adjustment station further includes an image capturing element configured to capture an image of said first gas sensor component, and said tilt angle is specified based on a result of the image capturing by said image capturing element.

10. The gas sensor assembling apparatus according to claim 1, wherein a direction in which said conveyance mechanism conveys is a direction in which said posture adjustment station and said integration station are arrayed.

11. The gas sensor assembling apparatus according to claim 10, further comprising:

an orientation check station checks the disposed orientation of said first gas sensor component in said insertion possible posture in a horizontal plane is performed when a directional relation between said first gas sensor component and said second gas sensor component at insertion of said sensor element into said insertion port of said first gas sensor component is determined in advance, the orientation check station being provided between said posture adjustment station and said integration station; and an orientation determination element configured to determine, based on a result of checking in said orientation check station, whether the disposed orientation of said first gas sensor component in said insertion possible posture in a horizontal plane is a positive orientation or an opposite orientation different from each other by 180°, wherein an insertion orientation of said second gas sensor component to said insertion port at said integration station is specified based on a result of the determination by said orientation determination element.

12. The gas sensor assembling apparatus according to claim 11, wherein said second gas sensor component includes a plurality of contact-point members provided to each of said pair of housing members, and is attached with:

a wire harness internally including a plurality of lead wires each having one end part electrically connected with the corresponding one of said plurality of contact-point members, and a connector including a plurality of connector pins each electrically connected with the other end part of the corresponding one of said plurality of lead wires, said orientation check station includes a conduction check element configured to check conduction between at least one of said plurality of contact-point members and at least one of said plurality of connector pins, checking said disposed orientation of said first gas sensor component is performed by checking said conduction with said conduction check element, and said orientation determination element determines the disposed orientation of said first gas sensor component in said insertion possible posture in a horizontal plane based on a result of checking with said conduction check element.

13. The gas sensor assembling apparatus according to claim 12, wherein said conveyance mechanism further includes harness restriction means configured to restrict part of said wire harness to inside of a restriction region provided in advance.

14. A gas sensor assembling method of integrating a first gas sensor component having an insertion port and a second gas sensor component including a sensor element by inserting a part of said sensor element protruding from said second gas sensor component into said insertion port, the gas sensor assembling method comprising steps of:

(a) a step of conveying, by a predetermined conveyance mechanism, said first gas sensor component to a posture adjustment part that includes a rotation mechanism configured to adjust the posture of said first gas sensor component in a horizontal plane;

(b) a step of disposing said first gas sensor component at a posture adjustment position fixedly determined in advance by transferring said first gas sensor component from said conveyance mechanism to said posture adjustment part;

(c) a step of adjusting, by said posture adjustment part, the posture of said first gas sensor component by rotating said first gas sensor element with said rotation mechanism in a horizontal plane to an insertion possible posture, eliminating a tilt angle of the first gas sensor component, determined in advance with holding said first gas sensor component at said posture adjustment position;

(d) a step of transferring said first gas sensor component in said insertion possible posture from said posture adjustment element to said conveyance mechanism while maintaining said first gas sensor component at said posture adjustment position;

(e) a step of conveying, by said conveyance mechanism, said first gas sensor component to a predetermined integration position while maintaining said insertion possible posture; and (f) a step of integrating said first gas sensor component and said second gas sensor component at said integration position, wherein in said step (f), said first gas sensor component and said second gas sensor component are integrated by inserting said sensor element of said second gas sensor component into said insertion port of said first gas sensor component in said insertion possible posture.

15. The gas sensor assembling method according to claim 14, further comprising:

(g) a step of securing, by predetermined opening securing element provided to said conveyance mechanism, an opening of said insertion port provided to said first gas sensor component while maintaining, at said posture adjustment position, said first gas sensor component having been transferred through said step (d), wherein in said step (e), said first gas sensor component is conveyed to said integration position by said conveyance mechanism maintaining said insertion possible posture and the secured opening of said insertion port, and in said step (f), said sensor element is inserted into said insertion port where the opening has been secured by said opening securing element.

16. The gas sensor assembling method according to claim 15, wherein said first gas sensor component includes a housing constituted by a pair of housing members having an identical sectional shape and disposed opposite to each other, and has a configuration in which said housing is restricted from outside by a predetermined restriction member, said insertion port is a space formed between said pair of housing members in said housing and having a rectangular sectional shape, said opening securing element includes a pair of claw parts, and in said step (g), an opening state of said insertion port is secured by inserting said pair of claw parts into two gaps formed between said pair of housing members at an end part of said housing member when said first gas sensor component is in said insertion possible posture at said posture adjustment position.

17. The gas sensor assembling method according to claim 16, wherein, a first direction is defined as a direction in which said insertion port extends in a horizontal plane when said first gas sensor component is in said insertion possible posture at said posture adjustment position, in said conveyance mechanism, said pair of claw parts are each provided movable back and forth in said first direction, and in said step (g), said pair of claw parts are moved along said first direction to be inserted into said two gaps, thereby to secure said opening of said insertion port.

18. The gas sensor assembling method according to claim 17, wherein in said conveyance mechanism, said pair of claw parts are attached to a pair of housing chucks configured to grasp said housing in said first direction, and in said step (g), said pair of claw parts are inserted into said two gaps while said housing is grasped by said pair of housing chucks, thereby to secure said opening of said insertion port.

19. The gas sensor assembling method according to claim 16, wherein said opening securing element further includes an opening pin provided movable back and forth relative to said insertion port of said first gas sensor component in said insertion possible posture, in said step (g), said pair of claw parts are inserted into said two gaps after said opening pin is inserted into said insertion port, and said opening pin is removed from said insertion port after said pair of claw parts are inserted into said two gaps, and said first gas sensor component is conveyed to said integration position through said step (e) after said opening pin is removed from said insertion port.

20. The gas sensor assembling method according to claim 14, wherein a position of a rotation center of said rotation mechanism is defined as said posture adjustment position, and in said step (c), said first gas sensor component is held at said posture adjustment position, so that said first gas sensor component is adjusted to said insertion possible posture at said posture adjustment position.

21. The gas sensor assembling method according to claim 20, wherein said rotation mechanism includes a pair of grasping elements configured to rotate about said rotation center while grasping said first gas sensor component so that an axis center position of said first gas sensor component coincides with the position of said rotation center as said posture adjustment position, and in said step (b) and said step (d), said first gas sensor component is transferred between said pair of grasping elements and said conveyance mechanism.

22. The gas sensor assembling method according to claim 20, wherein in said step (c), said tilt angle is specified based on an image capturing result obtained by capturing an image of said first gas sensor component through a predetermined image capturing element.

23. The gas sensor assembling method according to claim 14, further comprising:

(h) a step of checking the disposed orientation of said first gas sensor component in said insertion possible posture in a horizontal plane when a directional relation between said first gas sensor component and said second gas sensor component at insertion of said sensor element into said insertion port of said first gas sensor component is determined in advance; and (i) a step of determining, based on a result of said step (h), whether the disposed orientation of said first gas sensor component in said insertion possible posture in a horizontal plane is a positive orientation or an opposite orientation different from each other by 180°, wherein an insertion orientation of said second gas sensor component to said insertion port at said integration position is specified based on a result of the determination in said step (i).

24. The gas sensor assembling method according to claim 23, wherein said second gas sensor component includes a plurality of contact-point members provided to each of said pair of housing members, and is attached with:

a wire harness internally including a plurality of lead wires each having one end part electrically connected with the corresponding one of said plurality of contact-point members, and a connector including a plurality of connector pins each electrically connected with the other end part of the corresponding one of said plurality of lead wires, said step (h) is a step of checking conduction between at least one of said plurality of contact-point members and at least one of said plurality of connector pins, and in said step (i), the disposed orientation of said first gas sensor component in said insertion possible posture in a horizontal plane is determined based on a result of said step of checking conduction.

25. The gas sensor assembling method according to claim 24, further comprising:

(j) a step of holding, by said conveyance mechanism, said first gas sensor component before said step (a), wherein in said step (j), part of said wire harness is restricted to inside of a restriction region provided to said conveyance mechanism in advance.

* * * * *